United States Patent
Moorti et al.

(10) Patent No.: US 10,103,774 B1
(45) Date of Patent: Oct. 16, 2018

(54) SYSTEMS AND METHODS FOR INTELLIGENTLY-TUNED DIGITAL SELF-INTERFERENCE CANCELLATION

(71) Applicant: Kumu Networks, Inc., Sunnyvale, CA (US)

(72) Inventors: Rajendra Tushar Moorti, Sunnyvale, CA (US); Kumar Viswanatha, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/937,605

(22) Filed: Mar. 27, 2018

Related U.S. Application Data

(60) Provisional application No. 62/477,301, filed on Mar. 27, 2017.

(51) Int. Cl.
*H04B 1/56* (2006.01)
*H04B 1/12* (2006.01)
*H04L 25/02* (2006.01)
*H04L 5/14* (2006.01)
*H04L 27/26* (2006.01)

(52) U.S. Cl.
CPC ............. *H04B 1/56* (2013.01); *H04B 1/12* (2013.01); *H04L 25/0202* (2013.01); *H04L 5/14* (2013.01); *H04L 27/2628* (2013.01)

(58) Field of Classification Search
CPC .... H04B 1/56; H04B 1/12; H04L 5/14; H04L 27/2628; H04L 25/0202
USPC .......................................................... 375/219
See application file for complete search history.

(56) References Cited

U.S. PATENT DOCUMENTS

| | | | |
|---|---|---|---|
| 3,922,617 A | 11/1975 | Denniston et al. |
| 4,321,624 A | 3/1982 | Gibson et al. |
| 4,952,193 A | 8/1990 | Talwar |
| 5,212,827 A | 5/1993 | Meszko et al. |
| 5,691,978 A | 11/1997 | Kenworthy |
| 5,734,967 A | 3/1998 | Kotzin et al. |

(Continued)

FOREIGN PATENT DOCUMENTS

| | | |
|---|---|---|
| CN | 1204898 | 1/1999 |
| CN | 1901362 | 1/2007 |

(Continued)

OTHER PUBLICATIONS

Bharadia et al., "Full Duplex Radios" SIGOMM, Aug. 12-16, 2013, Hong Kong, China, Copyright 2013 ACM 378-1-4503-2056-6/6/13/08, 12 pages.

(Continued)

*Primary Examiner* — Michael Neff
(74) *Attorney, Agent, or Firm* — Jeffrey Schox; Thomas Gwinn

(57) ABSTRACT

A system for digital self-interference cancellation includes a filter that generates a reduced-noise digital residue signal; a channel estimator that generates a current self-interference channel estimate from a digital transmit signal, the reduced-noise digital residue signal, and past self-interference channel estimates; a controller that dynamically sets the digital transform configuration in response to changes in a controller-sampled digital residue signal; and a channel memory that stores the past self-interference channel estimates.

25 Claims, 20 Drawing Sheets

(56) References Cited

U.S. PATENT DOCUMENTS

| | | |
|---|---|---|
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,411,250 B1 | 6/2002 | Oswald et al. |
| 6,490,328 B1 | 12/2002 | Wu |
| 6,539,204 B1 | 3/2003 | Marsh et al. |
| 6,567,649 B2 | 5/2003 | Souissi |
| 6,580,771 B2 | 6/2003 | Kenney |
| 6,639,551 B2 | 10/2003 | Li et al. |
| 6,657,950 B1 | 12/2003 | Jones, IV et al. |
| 6,686,879 B2 | 2/2004 | Shattil |
| 6,725,017 B2 | 4/2004 | Blount et al. |
| 6,778,599 B1 | 8/2004 | Doron |
| 6,907,093 B2 | 6/2005 | Blount et al. |
| 6,915,112 B1 | 7/2005 | Sutton et al. |
| 6,965,657 B1 | 11/2005 | Rezvani et al. |
| 6,985,705 B2 | 1/2006 | Shohara |
| 7,057,472 B2 | 6/2006 | Fukamachi et al. |
| 7,139,543 B2 | 11/2006 | Shah |
| 7,177,341 B2 | 2/2007 | McCorkle |
| 7,188,135 B2 | 3/2007 | Takatori et al. |
| 7,228,104 B2 | 6/2007 | Collins et al. |
| 7,266,358 B2 | 9/2007 | Hillstrom |
| 7,302,024 B2 | 11/2007 | Arambepola |
| 7,336,128 B2 | 2/2008 | Suzuki et al. |
| 7,336,940 B2 | 2/2008 | Smithson |
| 7,348,844 B2 | 3/2008 | Jaenecke |
| 7,349,505 B2 | 3/2008 | Blount et al. |
| 7,362,257 B2 | 4/2008 | Bruzzone et al. |
| 7,372,420 B1 | 5/2008 | Osterhues et al. |
| 7,397,843 B2 | 7/2008 | Grant et al. |
| 7,426,242 B2 | 9/2008 | Thesling |
| 7,508,898 B2 | 3/2009 | Cyr et al. |
| 7,509,100 B2 | 3/2009 | Toncich |
| 7,706,755 B2 | 4/2010 | Muhammad et al. |
| 7,733,813 B2 | 6/2010 | Shin et al. |
| 7,773,759 B2 | 8/2010 | Alves et al. |
| 7,773,950 B2 | 8/2010 | Wang et al. |
| 7,778,611 B2 | 8/2010 | Asai et al. |
| 7,869,527 B2 | 1/2011 | Vetter et al. |
| 7,948,878 B2 | 5/2011 | Briscoe et al. |
| 7,962,170 B2 | 6/2011 | Axness et al. |
| 7,987,363 B2 | 7/2011 | Chauncey et al. |
| 7,999,715 B2 | 8/2011 | Yamaki et al. |
| 8,005,235 B2 | 8/2011 | Rebandt, II et al. |
| 8,023,438 B2 | 9/2011 | Kangasmaa et al. |
| 8,027,642 B2 | 9/2011 | Proctor, Jr. et al. |
| 8,031,744 B2 | 10/2011 | Radunovic et al. |
| 8,032,183 B2 | 10/2011 | Rudrapatna |
| 8,055,235 B1 | 11/2011 | Gupta et al. |
| 8,060,803 B2 | 11/2011 | Kim |
| 8,081,695 B2 | 12/2011 | Chrabieh et al. |
| 8,085,831 B2 | 12/2011 | Teague |
| 8,086,191 B2 | 12/2011 | Fukuda et al. |
| 8,090,320 B2 | 1/2012 | Dent |
| 8,155,046 B2 | 4/2012 | Jung et al. |
| 8,155,595 B2 | 4/2012 | Sahin et al. |
| 8,160,176 B2 | 4/2012 | Dent et al. |
| 8,175,535 B2 | 5/2012 | Mu |
| 8,179,990 B2 | 5/2012 | Orlik et al. |
| 8,218,697 B2 | 7/2012 | Guess et al. |
| 8,270,456 B2 | 9/2012 | Leach et al. |
| 8,274,342 B2 | 9/2012 | Tsutsumi et al. |
| 8,300,561 B2 | 10/2012 | Elahi et al. |
| 8,306,480 B2 | 11/2012 | Muhammad et al. |
| 8,331,477 B2 | 12/2012 | Huang et al. |
| 8,349,933 B2 | 1/2013 | Bhandari et al. |
| 8,351,533 B2 | 1/2013 | Shrivastava et al. |
| 8,385,855 B2 | 2/2013 | Lorg et al. |
| 8,385,871 B2 | 2/2013 | Wyville |
| 8,391,878 B2 | 3/2013 | Tenny |
| 8,417,750 B2 | 4/2013 | Yan et al. |
| 8,422,540 B1 | 4/2013 | Negus et al. |
| 8,428,542 B2 | 4/2013 | Bornazyan |
| 8,446,892 B2 | 5/2013 | Ji et al. |
| 8,456,230 B2 | 6/2013 | Fratti |
| 8,457,549 B2 | 6/2013 | Weng et al. |
| 8,462,697 B2 | 6/2013 | Park et al. |
| 8,467,757 B2 | 6/2013 | Ahn |
| 8,498,585 B2 | 7/2013 | Vandenameele |
| 8,502,924 B2 | 8/2013 | Liou et al. |
| 8,509,129 B2 | 8/2013 | Deb et al. |
| 8,521,090 B2 | 8/2013 | Kim et al. |
| 8,576,752 B2 | 11/2013 | Sarca |
| 8,600,331 B2 | 12/2013 | Kravets |
| 8,611,401 B2 | 12/2013 | Lakkis |
| 8,619,916 B2 | 12/2013 | Jong |
| 8,624,851 B2 | 1/2014 | Kim et al. |
| 8,625,686 B2 | 1/2014 | Li et al. |
| 8,626,090 B2 | 1/2014 | Dalipi |
| 8,649,417 B2 | 2/2014 | Baldemair et al. |
| 8,711,943 B2 | 4/2014 | Rossato et al. |
| 8,744,377 B2 | 6/2014 | Rimini et al. |
| 8,750,786 B2 | 6/2014 | Larsson et al. |
| 8,755,756 B1 | 6/2014 | Zhang et al. |
| 8,767,869 B2 | 7/2014 | Rimini et al. |
| 8,787,907 B2 | 7/2014 | Jain et al. |
| 8,798,177 B2 | 8/2014 | Park et al. |
| 8,804,975 B2 | 8/2014 | Harris et al. |
| 8,837,332 B2 | 9/2014 | Khojastepour et al. |
| 8,842,584 B2 | 9/2014 | Jana et al. |
| 8,879,433 B2 | 11/2014 | Khojastepour et al. |
| 8,879,811 B2 | 11/2014 | Liu et al. |
| 8,913,528 B2 | 12/2014 | Cheng et al. |
| 8,929,550 B2 | 1/2015 | Shattil et al. |
| 8,995,410 B2 | 3/2015 | Balan et al. |
| 9,014,069 B2 | 4/2015 | Patil et al. |
| 9,019,849 B2 | 4/2015 | Hui et al. |
| 9,031,567 B2 | 5/2015 | Haub |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 | 7/2015 | Mehlman et al. |
| 9,112,476 B2 | 8/2015 | Basaran et al. |
| 9,124,475 B2 | 9/2015 | Li et al. |
| 9,130,747 B2 | 9/2015 | Zinser et al. |
| 9,136,883 B1 | 9/2015 | Moher et al. |
| 9,160,430 B2 | 10/2015 | Maltsev et al. |
| 9,166,766 B2 | 10/2015 | Jana et al. |
| 9,184,902 B2 | 11/2015 | Khojastepour et al. |
| 9,185,711 B2 | 11/2015 | Lin et al. |
| 9,231,647 B2 | 1/2016 | Polydoros et al. |
| 9,231,712 B2 | 1/2016 | Hahn et al. |
| 9,236,996 B2 | 1/2016 | Khandani |
| 9,264,024 B2 | 2/2016 | Shin et al. |
| 9,312,895 B1 | 4/2016 | Gupta et al. |
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |
| 9,461,698 B2 | 10/2016 | Moffatt et al. |
| 9,490,963 B2 | 11/2016 | Choi et al. |
| 9,516,545 B2 | 12/2016 | Cheng et al. |
| 9,537,543 B2 | 1/2017 | Choi |
| 9,647,705 B2 * | 5/2017 | Pack .................. H04B 1/0475 |
| 9,667,299 B2 | 5/2017 | Choi et al. |
| 9,698,860 B2 | 7/2017 | Bharadia et al. |
| 9,698,861 B2 | 7/2017 | Braithwaite |
| 9,713,010 B2 | 7/2017 | Khandani |
| 9,742,593 B2 | 8/2017 | Moorti et al. |
| 9,787,459 B2 | 10/2017 | Azadet |
| 9,887,728 B2 | 2/2018 | Jain et al. |
| 2002/0154717 A1 | 10/2002 | Shima et al. |
| 2003/0112860 A1 | 6/2003 | Erdogan |
| 2004/0106381 A1 | 6/2004 | Tiller |
| 2005/0250466 A1 | 11/2005 | Varma et al. |
| 2006/0058022 A1 | 3/2006 | Webster et al. |
| 2006/0153283 A1 | 7/2006 | Scharf et al. |
| 2007/0207747 A1 | 9/2007 | Johnson et al. |
| 2007/0249314 A1 | 10/2007 | Sanders et al. |
| 2008/0075189 A1 | 3/2008 | Li et al. |
| 2008/0131133 A1 | 6/2008 | Blunt et al. |

(56) References Cited

U.S. PATENT DOCUMENTS

| | | |
|---|---|---|
| 2008/0219377 A1 | 9/2008 | Nisbet |
| 2010/0103900 A1 | 4/2010 | Yeh et al. |
| 2010/0136900 A1 | 6/2010 | Seki |
| 2010/0215124 A1 | 8/2010 | Zeong et al. |
| 2010/0226448 A1 | 9/2010 | Dent |
| 2011/0013684 A1 | 1/2011 | Semenov et al. |
| 2011/0026509 A1 | 2/2011 | Tanaka |
| 2011/0256857 A1 | 10/2011 | Chen et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0166259 A1 | 6/2013 | Weber et al. |
| 2013/0253917 A1 | 9/2013 | Schildbach |
| 2013/0301487 A1 | 11/2013 | Khandani |
| 2014/0011461 A1 | 1/2014 | Bakalski et al. |
| 2014/0169236 A1 | 6/2014 | Choi et al. |
| 2014/0313946 A1 | 10/2014 | Azadet |
| 2014/0348018 A1 | 11/2014 | Bharadia et al. |
| 2014/0348032 A1 | 11/2014 | Hua et al. |
| 2015/0139122 A1 | 5/2015 | Rimini et al. |
| 2015/0188646 A1 | 7/2015 | Bharadia et al. |
| 2015/0215937 A1 | 7/2015 | Khandani |
| 2015/0303984 A1 | 10/2015 | Braithwaite |
| 2016/0036582 A1 | 2/2016 | Jana et al. |
| 2016/0100415 A1 | 4/2016 | Mishra et al. |
| 2016/0218769 A1 | 7/2016 | Chang et al. |
| 2016/0226653 A1 | 8/2016 | Bharadia et al. |
| 2016/0266245 A1 | 9/2016 | Bharadia et al. |
| 2016/0380799 A1 | 12/2016 | Chang et al. |
| 2017/0041165 A1* | 2/2017 | Cheng ............... H04L 1/00 |
| 2017/0104506 A1* | 4/2017 | Liu ............... H04B 1/1027 |
| 2017/0141886 A1* | 5/2017 | Chung ............... H04L 5/006 |
| 2018/0013466 A1* | 1/2018 | Kim ............... H04B 1/525 |

FOREIGN PATENT DOCUMENTS

| | | |
|---|---|---|
| EP | 0755141 | 1/1997 |
| EP | 1959625 | 2/2009 |
| EP | 2237434 | 10/2010 |
| EP | 2267946 | 12/2010 |
| JP | 2001196994 | 7/2001 |
| JP | 2004563315 | 2/2004 |
| RU | 2256985 | 7/2005 |
| WO | 173250 | 11/2013 |
| WO | 185106 | 12/2013 |
| WO | 093916 | 6/2014 |

OTHER PUBLICATIONS

Yingbo Hua et al., A Method for Broadband Full-Duplex MIMO Radio, IEEE Signal Processing Letters, vol. 19, No. 12, Dec. 1, 2012.

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

Shenghong Li et al., Full-Duplex Wireless Communication Using Transmitter Output Based Echo Cancellation, IEEE Globecom 2011, Dec. 5, 2011.

Taneli Riihonen et al., Mitigation of Loopback Self-Interference in Full-Duplex MIMO Relays, IEEE Transactions on Signal Processing, vol. 59, No. 12 Dec. 1, 2011.

\* cited by examiner

SYSTEMS AND METHODS FOR INTELLIGENTLY-TUNED DIGITAL SELF-INTERFERENCE CANCELLATION

CROSS-REFERENCE TO RELATED APPLICATIONS

This application claims the benefit of U.S. Provisional Application Ser. No. 62/477,301, filed on 27 Mar. 2017, which is incorporated in its entirety by this reference.

TECHNICAL FIELD

This invention relates generally to the wireless communications field, and more specifically to new and useful systems and methods for intelligently-tuned digital self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, especially when tuning digital self-interference cancellation systems. Thus, there is a need in the wireless communications field to create new and useful systems and methods for intelligently-tuned digital self-interference cancellation. This invention provides such new and useful systems and methods.

DESCRIPTION OF THE INVENTION EMBODIMENTS

Figure 1:
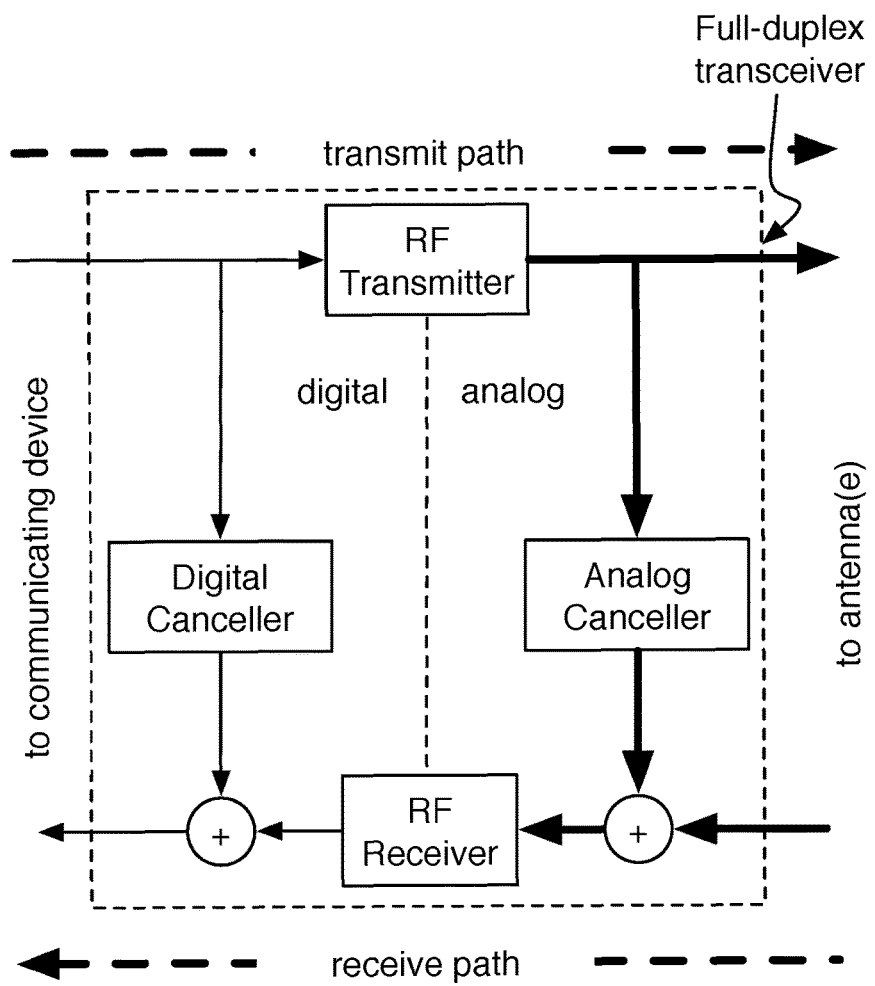
FIG. 1 is a schematic representation of a full-duplex transceiver.

The following description of the invention embodiments of the invention is not intended to limit the invention to these invention embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system. The analog cancellation system removes a first portion of self-interference by summing delayed and scaled versions of the RF transmit signal to create an RF self-interference cancellation signal, which is then subtracted from the RF receive signal. Alternatively, the analog cancellation system may perform similar tasks at an intermediate frequency. After the RF (or IF) receive signal has the RF/IF self-interference cancellation signal subtracted, it passes through an analog-to-digital converter of the receiver (and becomes a digital receive signal). After this stage, a digital self-interference cancellation signal (created by transforming a digital transmit signal) is then subtracted from the digital receive signal.

Full-duplex transceivers often include tuning systems that adjust tunable parameters of the analog self-interference cancellation system in order to adapt the analog self-interference cancellation signal to changing self-interference conditions. Likewise, full-duplex transceivers may similarly include tuning systems that alter the transform configuration of digital self-interference cancellation systems for the same purpose.

Well-tuned digital and analog self-interference cancellation systems are generally effective for reducing interference, but tuning in these systems is often a time-consuming process. This poses a problem: the longer a system takes to retune, the more likely it is that the system will be unable to adapt to rapidly changing self-interference characteristics. Consequently, the usefulness of full-duplex transceivers may be limited.

The systems and methods described herein increase tuning performance of full-duplex transceivers as shown in FIG. 1 (and other applicable systems) by performing digital self-interference canceller tuning, thus allowing for increased effectiveness in self-interference cancellation. Other applicable systems include active sensing systems (e.g., RADAR), wired communications systems, wireless communications systems, and/or any other suitable system, including communications systems where transmit and receive bands are close in frequency, but not overlapping.

2. System for Intelligently-Tuned Digital Self-Interference Cancellation

Figure 2:
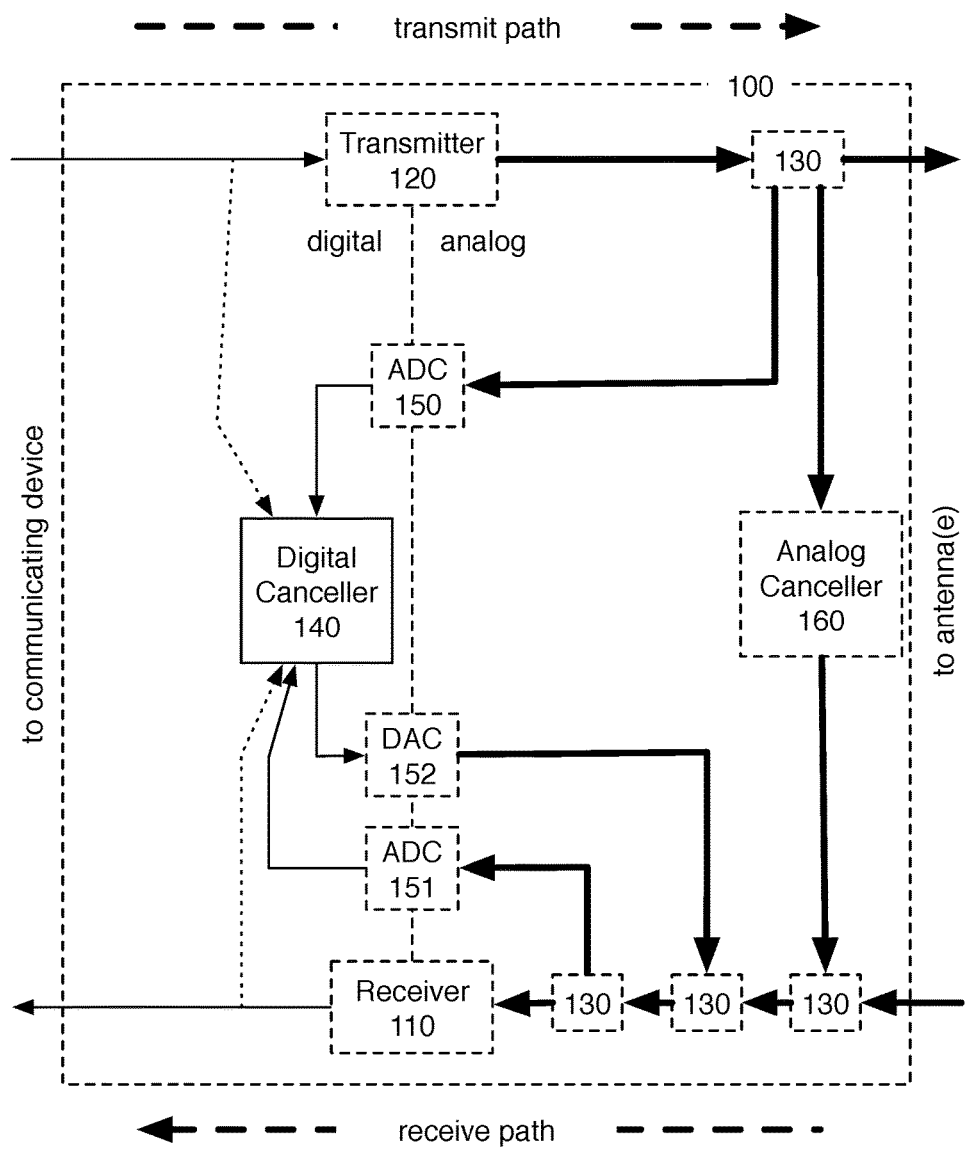
FIG. 2 is a schematic representation of a system of an invention embodiment.

As shown in FIG. 2, a system 100 for intelligently-tuned digital self-interference cancellation includes a digital self-interference canceller 140. The system 100 may additionally or alternatively include a receiver 110, a transmitter 120, a signal coupler 130, analog-to-digital converters (ADCs) 150 and 151, a digital-to-analog converter (DAC) 152, and an analog canceller 160.

The system 100 functions to increase the performance of self-interference cancellation by performing digital self-interference canceller tuning intelligently based on both transmit signal input and residue signal input. Transmit signal input is used to identify components of a transmit signal likely to be reflected in received self-interference, while residue signal input is used to determine the effects of self-interference cancellation.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The receiver 110 functions to receive analog receive signals transmitted over a communications link (e.g., a wireless channel, a coaxial cable). The receiver no preferably converts analog receive signals into digital receive signals for processing by a communications system, but may additionally or alternatively not convert analog receive signals (passing them through directly without conversion).

The receiver no is preferably a radio-frequency (RF) receiver substantially similar to the receiver of U.S. patent application Ser. No. 15/362,289, the entirety of which is incorporated by this reference, but may additionally or alternatively be any suitable receiver.

The transmitter 120 functions to transmit signals of the communications system over a communications link to a second communications system. The transmitter 120 preferably converts digital transmit signals into analog transmit signals.

The transmitter 120 is preferably a radio-frequency (RF) transmitter substantially similar to the transmitter of U.S. patent application Ser. No. 15/362,289, but may additionally or alternatively be any suitable transmitter.

The signal coupler 130 functions to allow signals to be split and/or joined. The signal coupler 130 may be used to provide a sample of the analog transmit signal for the digital canceller 140 and/or analog cancellers 160; that is, the signal coupler 130 may serve as a transmit coupler. The signal coupler 130 may also be used to combine one or more analog self-interference cancellation signals (from analog/digital cancellers) with the analog receive signal; that is, the signal coupler 130 may serve as a receive coupler. Additionally or alternatively, the signal coupler 130 may be used for any other purpose. For example, as shown in FIG. 2, a signal coupler 130 may be used to provide a sample of a residue signal (in this case, an analog receive signal that has already been combined with an analog self-interference cancellation signal) to the digital canceller 140. The signal coupler 130 is preferably substantially similar to the signal coupler of U.S. patent application Ser. No. 15/362,289, but may additionally or alternatively be any suitable signal coupler.

Figure 3A:
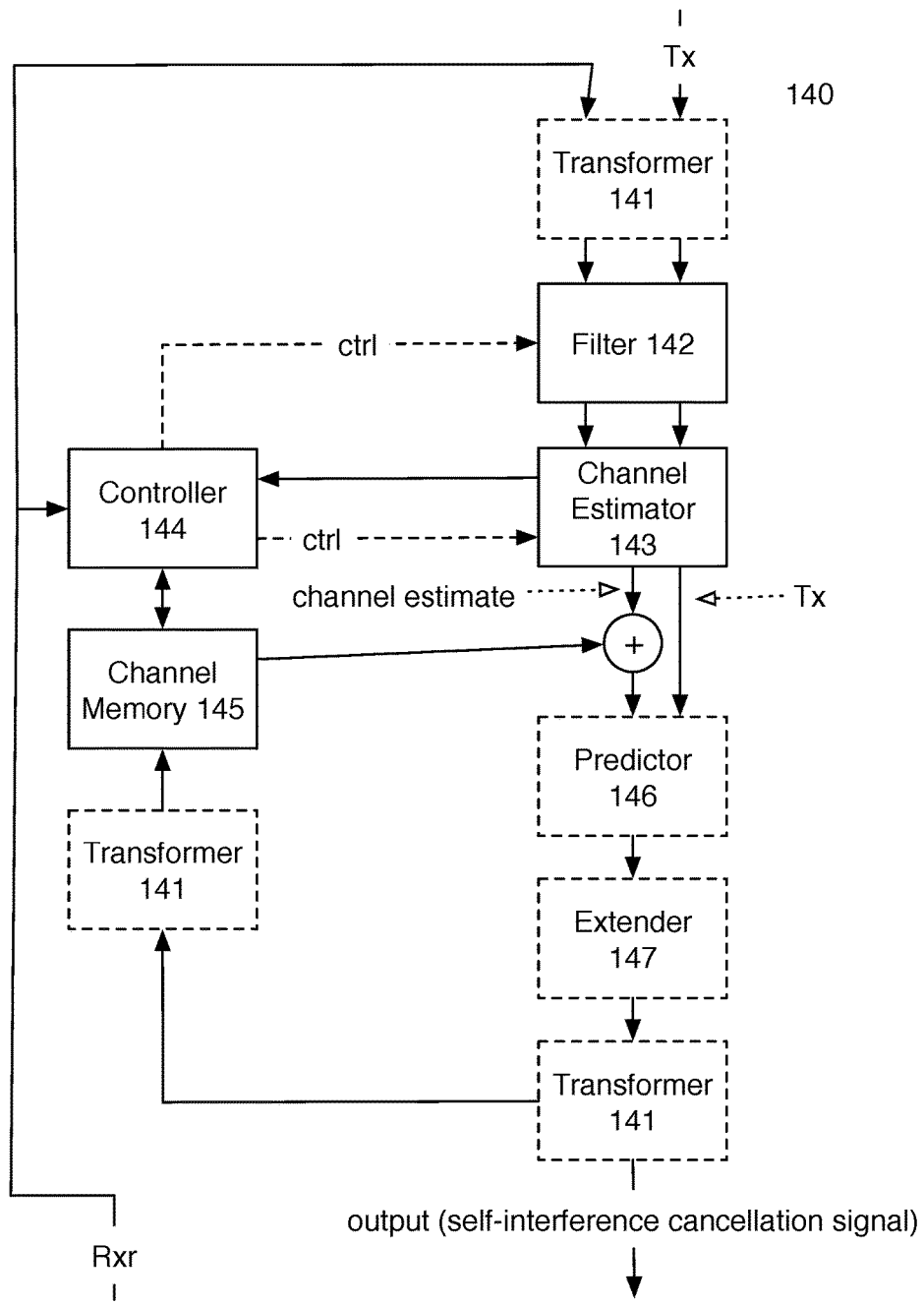
FIG. 3A is a schematic representation of a digital self-interference canceller of a system of an invention embodiment.
Figure 3B:
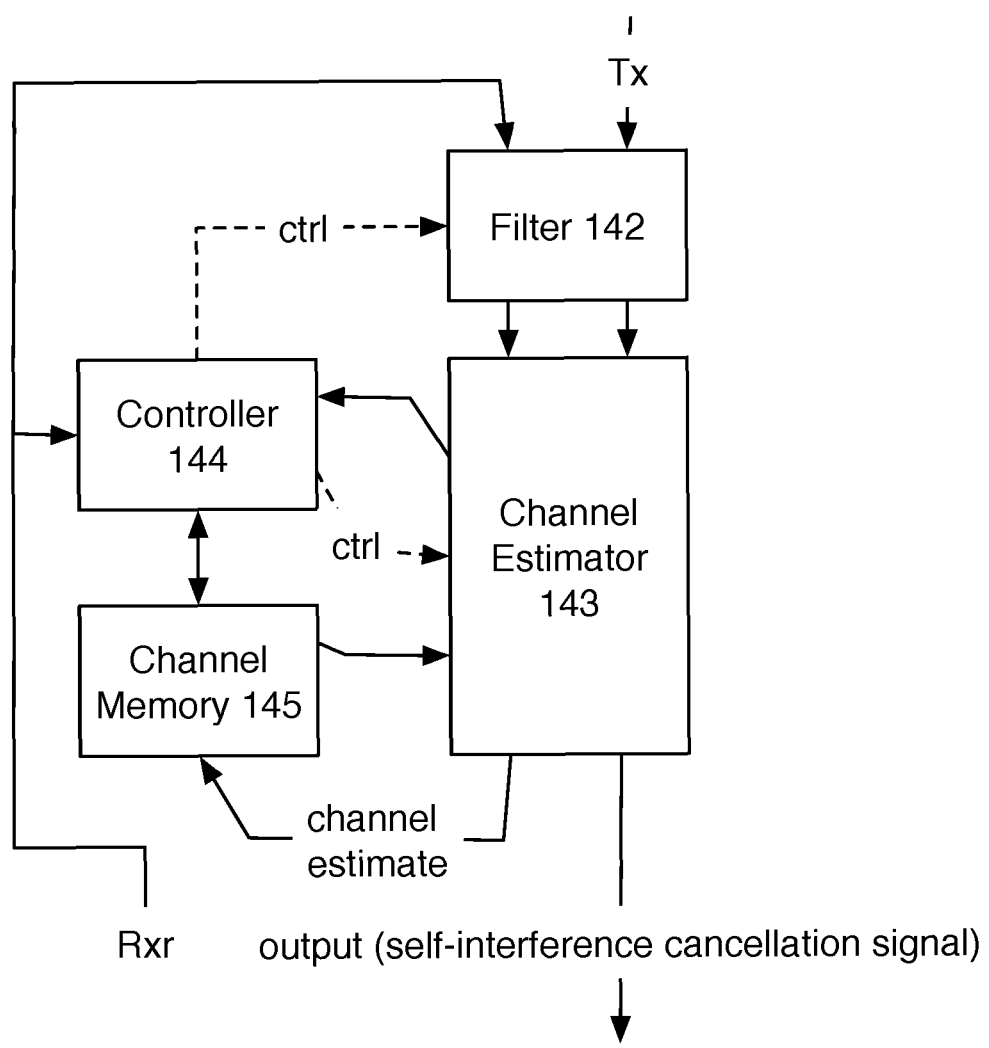
FIG. 3B is a schematic representation of a digital self-interference canceller of a system of an invention embodiment.
Figure 3C:
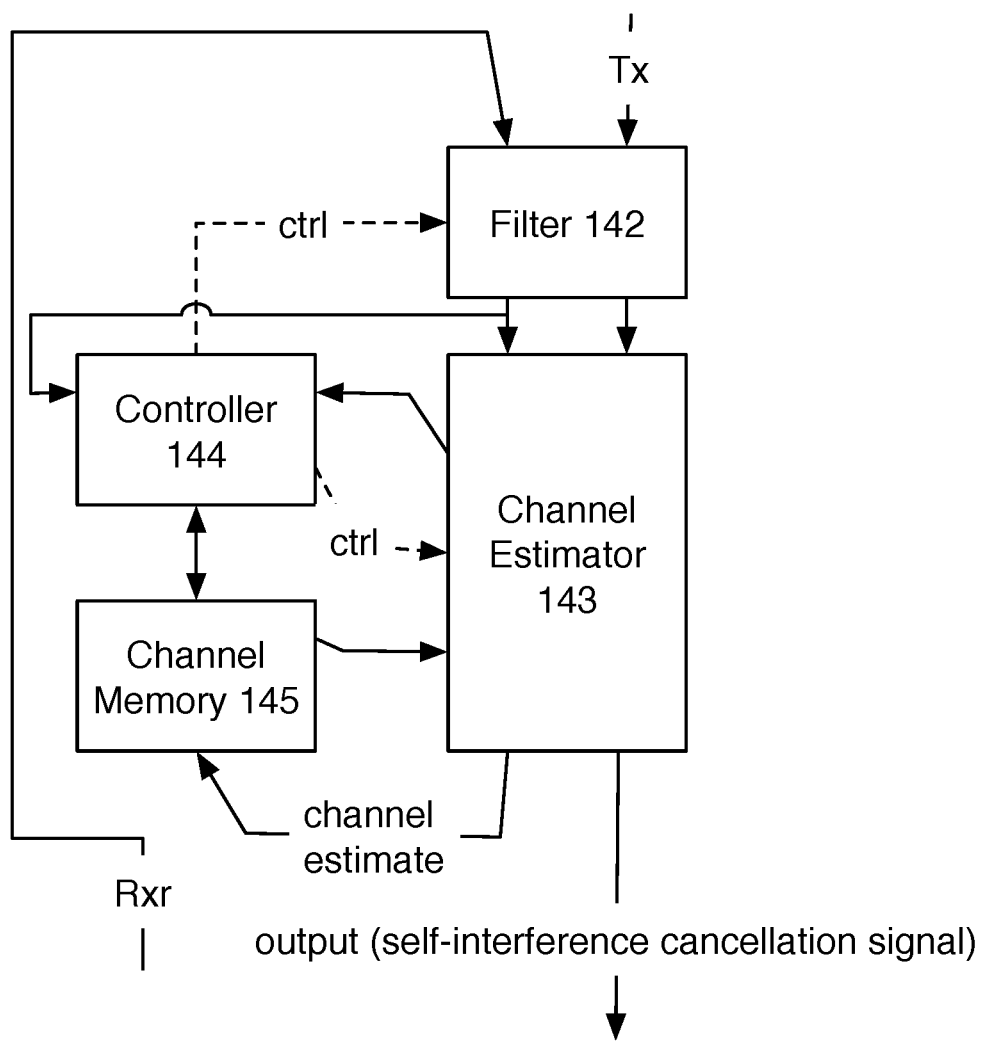
FIG. 3C is a schematic representation of a digital self-interference canceller of a system of an invention embodiment.

The digital self-interference canceller 140 functions to produce a digital self-interference cancellation signal from a digital transmit signal, as shown in FIG. 3A, FIG. 3B, and FIG. 3C. The digital self-interference cancellation signal is preferably converted to an analog self-interference cancellation signal (by the DAC 152) and combined with one or more analog self-interference cancellation signals to further reduce self-interference present in the RF receive signal at the receiver 110. Additionally or alternatively, the digital self-interference cancellation signal may be combined with a digital receive signal (e.g., after the receiver 110, as shown in FIG. 1).

The digital self-interference canceller 140 preferably samples the RF transmit signal of the transmitter 120 using the ADC 150 (additionally or alternatively, the canceller 140 may sample the digital transmit signal or any other suitable transmit signal) and transforms the sampled and converted RF (or IF) transmit signal to a digital self-interference signal based on a digital transform configuration. The digital transform configuration preferably includes settings that dictate how the digital self-interference canceller 140 transforms the digital transmit signal to a digital self-interference signal (e.g. coefficients of a generalized memory polynomial used to transform the transmit signal to a self-interference signal).

Note that the digital self-interference canceller 140 may be coupled to any transmit and/or receive signals (either as input to the canceller or as outputs of the canceller), as described in U.S. patent application Ser. No. 14/569,354, the entirety of which is incorporated by this reference. For example, the digital self-interference canceller may take as input an RF-sourced intermediate frequency (IF) transmit signal (e.g., the transmit signal is converted to RF by the transmitter 120, then downconverted to IF by a downconverter, then passed through the ADC 150 to the digital canceller 140) or may output at IF (e.g., the digital self-interference cancellation signal is converted to a digitally-sourced IF self-interference cancellation signal, and is then combined with an IF self-interference cancellation signal at IF, before the combined self-interference cancellation signal is converted to RF and combined with an RF receive signal).

The digital self-interference canceller 140 may be implemented using a general-purpose processor, a digital signal processor, an application specific integrated circuit (ASIC), a field programmable gate array (FPGA) and/or any suitable processor(s) or circuit(s). The digital self-interference canceller 140 preferably includes memory to store configuration data, but may additionally or alternatively be configured using externally stored configuration data or in any suitable manner.

The digital self-interference canceller 140 preferably includes a filter 142, a channel estimator 143, a controller 144, and channel memory 145, as shown in FIG. 3A, FIG. 3B, and FIG. 3C. The digital self-interference canceller may additionally or alternatively include a transformer 141, a predictor 146, and/or an extender 147.

The transformer 141 functions to transform signals (e.g., a digital transmit signal, an output signal of the canceller 140) into an alternate-basis representation to perform some function (generally, to calculate the self-interference channel before transforming the channel back into the original representation).

Figure 4:
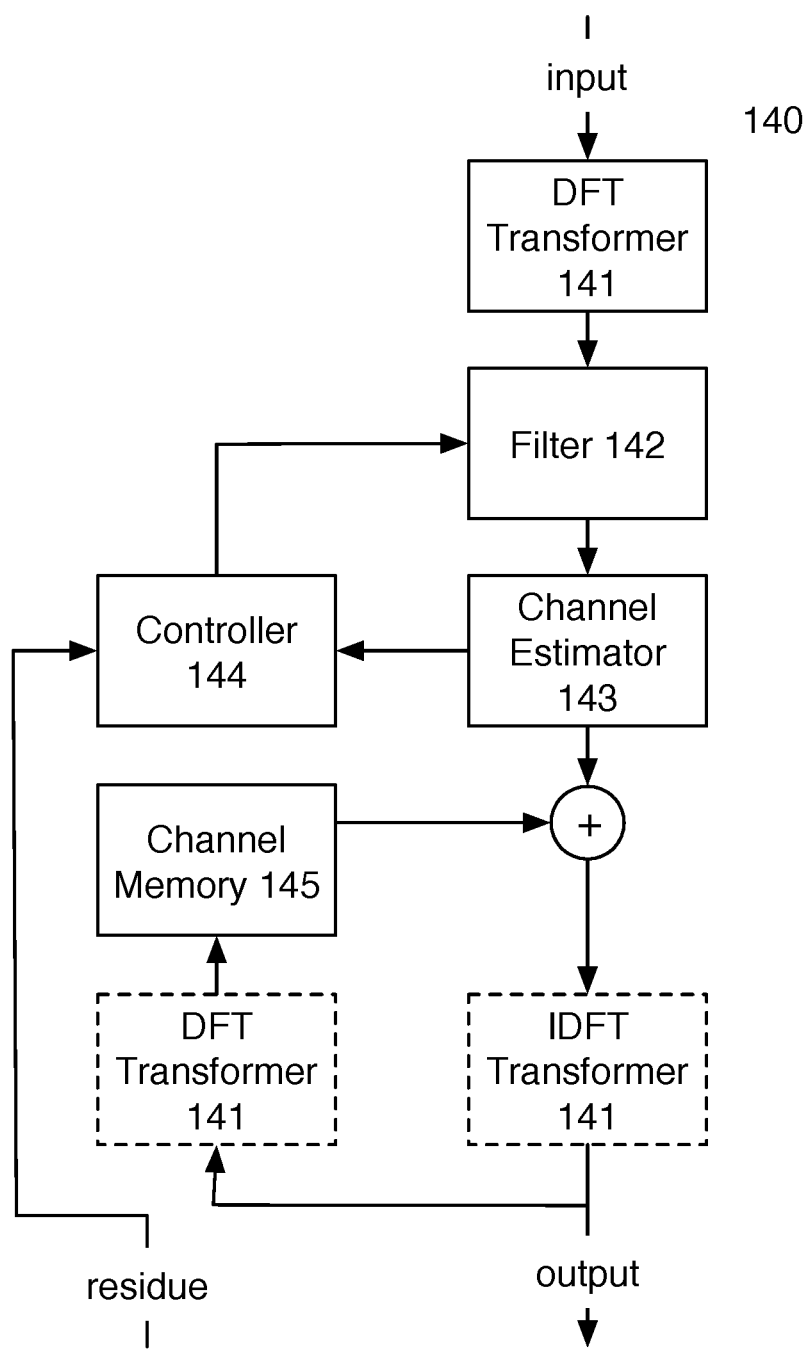
FIG. 4 is a schematic representation of a digital self-interference canceller of a system of an invention embodiment.

For example, in one implementation as shown in FIG. 4, transformers 141 may be used to convert time-domain input signals into the frequency domain (via a Fourier transform). The Fourier-transformed input is used to generate a self-interference cancellation signal, which is then converted back to the time domain by another transformer 141. In this implementation, the Fourier transform may be performed using a Discrete Fourier Transform (DFT) matrix. Likewise, the inverse Fourier transform may be calculated using the pseudo-inverse of the DFT matrix; i.e., an Inverse Discrete Fourier Transform (IDFT) matrix. Calculating the IDFT using the DFT without modification results in the same number of time domain signal components generated (e.g., 'taps' of the self-interference cancellation channel) as frequency points in the original DFT.

In many cases, it may be desirable to perform the DFT using a high resolution matrix (i.e., use many frequencies), while receiving a lower-resolution (i.e., fewer number of time domain components) solution. Likewise, it may be desirable to restrict the solution to specific frequencies of interest (or simply lower frequency resolution used to generate the solution). To accomplish this, in one embodiment, a transformer 141 may perform the IFFT using a reduced IDFT matrix calculated by first reducing the number of time and frequency domain components (e.g., zeroing out parts of the matrix, neglecting parts of the matrix) present in the DFT matrix and then calculating the pseudo-inverse of this reduced DFT matrix to generate the reduced IDFT matrix.

Frequency and time domain components may be removed in any manner and to accomplish any goal. For example, time domain components may be removed to match a certain solution size (e.g., 64 taps), and frequency components may be removed if they are not considered frequencies of particular interest (e.g., as determined from a lookup table of which receive frequencies are important, by measuring the accuracy of self-interference cancellation at different frequencies, by measuring the amount of self-interference present at different signals, etc.). Alternatively, DFT matrix reduction may be performed in any way.

While the transformer 141 may perform Fourier (or inverse Fourier) transforms as a basis-changing technique, the transformer 141 may additionally or alternatively perform any suitable basis-changing transformation. For example, many components of the self-interference channel solution may be correlated; this correlation can result in slow convergence of transform configuration parameters. Resultantly, in one implementation of a preferred embodiment, the transformers 141 may orthogonalize (or otherwise decorrelate) input components using a decorrelation matrix. For example, this decorrelation may be performed using a static decorrelation matrix based on a Gaussian input distribution (or other expected signal distribution) for a given transmission power or using a static decorrelation matrix based on subtraction of expected transmission power; e.g., $$\begin{bmatrix} \hat{s}_1 \\ \hat{s}_3 \\ \hat{s}_5 \end{bmatrix} = \begin{bmatrix} 1 & 0 & 0 \\ -3\sigma^2 & 1 & 0 \\ (15\sigma^4) & -10\sigma^2 & 1 \end{bmatrix} * \begin{bmatrix} s_1 \\ |s_1|^2 * s_1 \\ |s_1|^4 * s_1 \end{bmatrix}$$

where $\sigma^2$ is the power of the linear transmit signal $s_1$.

Transformers 141 may alternatively perform decorrelation using any other method, including using singular value decomposition (SVD), a dynamically computed decorrelation matrix, and/or a matrix similar to the above exemplified static matrix, except with expected power computed dynamically.

The filter 142 functions to reduce noise in the signals received at the filter. For example, the filter 142 may receive a transmit signal Tx and a residue signal Rxr (the receive signal Rx after digital self-interference cancellation), as shown in FIG. 3A. Additionally or alternatively, the filter 142 may receive any signals relevant to interference cancellation (e.g., Rx instead of Rxr, or a ratio of signals; e.g., Rxr/Tx). Note that the filter 142 may additionally or alternatively pass signals without filtering. For example, the filter 142 may pass a digital transmit signal without filtering it. Further, if the filter 142 outputs a signal based on the same content to different destinations, the filter 142 may filter the signal differently based on the destination. For example, the filter 142 may output a first filtered digital residue signal to the controller 144 and a second filtered digital residue signal to the channel estimator 143, and the parameters of filtering (and thus the output signals themselves) may be non-identical between the first and second filtered digital residue signals.

Rx may be written as follows: Rx=TxH+Z, where Rx is the receive signal (noting that this receive signal may already have some amount of interference cancellation resulting from analog cancellation), Tx is the transmit signal, H is the self-interference channel, and Z is noise (which includes an actual receive signal if present). Likewise, the residue signal after digital self-interference cancellation may be written as Rxr=Tx(H−Ĥ)+Z, where Ĥ is a self-interference channel estimate and −TxĤ represents the self-interference cancellation signal.

The filter 142 preferably reduces input noise by performing time-averaging of input signals to prepare the signals for self-interference cancellation signal generation. The filter 142 may perform time-averaging in any manner; e.g., block averaging, moving averaging, infinite impulse response (IIR) filtering, etc.

Time averaging functions to reduce the effect of noise in channel estimates (e.g., as Z varies independent of H). As discussed in later sections, the controller 144 preferably dynamically adjusts the number of samples the filter 142 uses to perform averaging (i.e., the averaging window) to improve canceller 140 performance. Larger sampling windows allow for increased immunity to noise, but at the cost of ability to track rapid self-interference channel variation. The controller 144 may additionally or alternatively vary any aspect of filtering.

The filter 142 may additionally or alternatively perform any signal transformation to aid in preparing input signals for self-interference cancellation. For example, the filter 142 may perform sample rate conversion of signals, scaling, shifting, and/or otherwise modifying signals.

In one implementation, the filter 142 modifies sampled digital transmit signals by removing information unlikely to substantially affect the output of the channel estimator 143. This may include, for instance, dropping samples if the samples do not represent a change above some change threshold from previous samples. As another example, if digital transmit signals correspond to a particular amplitude of an output analog signal, only digital signal data corresponding to an amplitude above some amplitude threshold may be passed to the channel estimator 143.

If the filter 142 receives digital transmit signals from more than one source (e.g. from both the digital transmit line before the RF transmitter and the analog transmit line after the RF transmitter via an ADC), the filter 142 may additionally or alternatively combine the signals in any suitable way or may select one signal over another. For instance, the filter 142 may pass the average of the two signals to the estimator 143. As another example, the filter 142 may prefer an RF-sourced digital transmit signal (e.g., from the ADC 150) over the transmit-path digital transmit signal (e.g., sampled before conversion by the transmitter 120) above a certain transmitter power, and vice versa at or below that transmitter power. The selection and combination of the two (or more) signals may be dependent on any suitable condition.

The filter 142 preferably passes both the digital transmit signal and the digital residue (i.e., the digital receive signal after the digital receive signal has been combined with the digital self-interference cancellation signal output by the system 100) but may additionally or alternatively pass any signals (e.g., a combination of transmit and residue, receive signal prior to combination with self-interference cancellation signal, etc.). The digital transmit signal after filtering may be referred to as a reduced-noise digital transmit signal; likewise, if the residue is filtered, it may be referred to as a reduced-noise residue signal.

The channel estimator 143 functions to generate a current self-interference cancellation channel estimate (Ĥ) from the output of the filter 142 or from any other suitable signal source.

The channel estimator 143 preferably generates a channel estimate from a weighted sum of signal components according to mathematical models adapted to model self-interference contributions of the RF transmitter, RF receiver, and/or other sources. Examples of mathematical models that may be used by the channel estimator 143 include generalized memory polynomial (GMP) models, Volterra models, and Wiener-Hammerstein models; the channel estimator 143 may additionally or alternatively use any combination or set of models.

The channel estimator 143 may additionally or alternatively use generated mathematical models for modeling self-interference contributions based on comparisons of sampled digital transmit signals to received signals (from the receive path or any other suitable source). These models may be generated from previously known models or may be created using neural network and/or machine learning techniques.

The channel estimator 143 preferably performs channel estimate generation according to a transform configuration set dynamically by the controller 144 (discussed in more detail in sections covering the controller 144). Additionally or alternatively, the channel estimator 143 may combine signal components in any manner in order to generate a self-interference channel estimate.

The channel estimator 143 preferably generates the self-interference channel estimate from a ratio of residue and transmit signals (e.g., Rxr/Tx) but may additionally or alternatively generate self-interference channel estimates from any signal data.

In addition to generating a self-interference channel estimate, the channel estimator 143 may also generate a self-interference cancellation signal by combining a digital transmit signal and the self-interference channel estimate (e.g., as shown in FIG. 3B). As a first alternative, the channel estimator 143 may pass the self-interference channel estimate along with the transmit signal without combining the two (e.g., as shown in FIG. 3A). As a second alternative, the channel estimator 143 may pass the self-interference channel estimate without passing the transmit signal. As a third alternative, the channel estimator 143 may pass any signal data relevant to self-interference cancellation.

Figure 5:
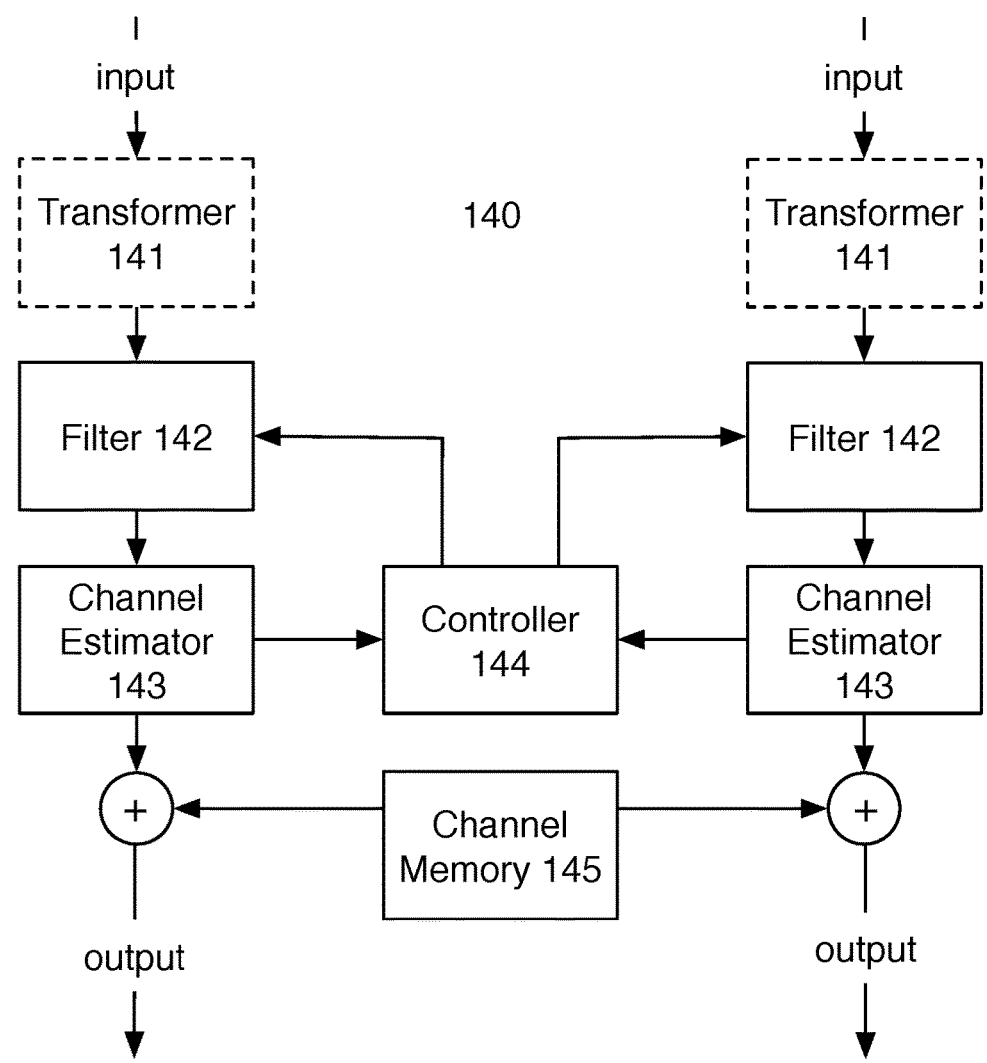
FIG. 5 is a schematic representation of a digital self-interference canceller of a system of an invention embodiment.

The digital self-interference canceller 140 preferably includes a single channel estimator 143, but may additionally or alternatively include multiple channel estimators 143. For example, the digital self-interference canceller 140 may include one channel estimator 143 for linear self-interference cancellation and one for non-linear self-interference cancellation, as shown in FIG. 5. Signal components may be transmitted to multiple channel estimators 143 in any manner. If the canceller 140 includes multiple channel estimators 143, the output of these filters may be combined in any manner to generate a self-interference cancellation signal.

The controller 144 functions to set the transform configuration of the channel estimator 143. The controller 144 may additionally or alternatively set configuration of the filter 142.

The transform configuration preferably includes the type of model or models used by the channel estimator 143 as well as configuration details pertaining to the models (each individual model is a model type paired with a particular set of configuration details). For example, one transform configuration might set the channel estimator 143 to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the filter 142 and/or the channel estimator 143. For example, if the channel estimator 143 includes multiple transform paths, the controller 144 may set the number of these transform paths, which model order their respective component generators correspond to, and/or any other suitable details. In general, the transform configuration may include any details relating to the computation or structure of the filter 142 and/or the channel estimator 143.

Transform configurations are preferably selected and/or generated by the controller 144. The controller 144 may set an appropriate transform configuration by selecting from stored static configurations, from generating configurations dynamically, or by any other suitable manner or combination of manners. For example, the controller 144 may choose from three static transform configurations based on their applicability to particular signal and/or environmental conditions (the first is appropriate for low transmitter power, the second for medium transmitter power, and the third for high transmitter power). As another example, the controller 144 may dynamically generate configurations based on signal and/or environmental conditions; the coefficients of a GMP model are set by a formula that takes transmitter power, temperature, and receiver power as input.

The controller 144 preferably sets transform configurations based on a variety of input data (whether transform configurations are selected from a set of static configurations or generated according to a formula or model). Input data used by the controller 144 may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), and/or system configuration data (e.g. receiver/transmitter settings), signal data (e.g., digital transmit signal, RF transmit signal, RF receive signal, digital receive signal). The controller 144 may additionally or alternatively generate and/or use models based on this input data to set transform configurations; for example, a transmitter manufacturer may give a model to predict internal temperature of the transmitter based on transmitter power, and the controller 144 may use the output of this model (given transmitter power) as input data for setting transform configurations.

When utilizing digital residue signals, the controller 144 preferably utilizes an un-filtered digital residue signal (as shown in FIGS. 3A and 3B), but may additionally or alternatively utilize a filtered digital residue signal (as shown in FIG. 3C). Likewise, any input signal data used by the controller 144 may be in raw form, in processed form, or in any other form. The digital residue signal used by the controller may be referred to as a controller-sampled digital residue signal.

The controller 144 may set transform configurations at any time, but preferably sets transform configurations in response to either a time threshold or other input data threshold being crossed. For example, the controller 144 may re-set transform configurations every ten seconds according to changed input data values. As another example, the controller 144 may re-set transform configurations whenever transmitter power thresholds are crossed (e.g. whenever transmitter power increases by ten percent since the last transform configuration setting, or whenever transmitter power increases over some static value).

The controller 144 may cooperate with the analog canceller 160 (for instance, setting transform configurations based on data from the analog canceller 160, coordinating transform configuration setting times with the analog canceller 160, disabling or modifying operation of the analog canceller 160) to reduce overall self-interference (or for any other suitable reason).

The controller 144 preferably adapts transform configurations and/or transform-configuration-generating algorithms (i.e., algorithms that dynamically generate transform configurations) to reduce self-interference for a given transmit signal and set of system/environmental conditions. The controller 144 may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

The controller 144 may adapt transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, the controller 144 may adapt transform configurations based on historical received data (e.g. what the signal looked like ten seconds ago) or any other suitable information. The controller 144 may additionally or alternatively adapt transform configurations based on the content of the transmitted signal; for instance, if the transmitted signal is modulated in a particular way, the controller 144 may look for that same modulation in the self-interference signal; more specifically, the controller 144 may adapt transform configurations such that when the self-interference signal is combined with the digital receive signal the remaining modulation (as an indicator of self-interference) is reduced (compared to a previous transform configuration).

The controller 144 may additionally or alternatively function to set tuning parameters for components outside of the digital self-interference canceller 140, particularly if those parameters are relevant to digital self-interference canceller performance and/or tuning.

In addition to setting the transform configuration, the controller 144 may also be used to change other parameters surrounding digital self-interference cancellation. For example, the controller 144 may be used to modify the size of the averaging window (i.e., number of samples used to perform averaging) of a filter 142 in response to estimated channel characteristics.

In a first implementation of an invention embodiment, the controller 144 modifies the averaging window based on channel power. For example, the controller 144 may modify the averaging window based on the magnitude of Rx/Tx or Rxr/Tx (as estimates of self-interference channel power). Additionally or alternatively, the controller 144 may use any signal power (e.g., magnitude of Tx) to modify the averaging window. The controller 144 may select averaging windows based on the value of power (e.g., higher power→larger window), the rate of change of power (e.g., higher d/dt [Rxr/Tx]→larger window), or in any other manner. For example, rate of change of power may be found using channel update power (e.g., the difference in estimated channel power between channel updates).

While the technique described in the first implementation does enable the digital self-interference canceller 140 to adapt to changing self-interference channel conditions, it is not ideal for differentiating between scenarios where receive signal variation is largely due to variation in the channel and scenarios where receive signal variation is largely due to variation in noise (i.e., Z).

In a second implementation of an invention embodiment, the controller 144 modifies the averaging window based on a channel dynamics estimation $\eta$. $\eta$ is preferably a metric that differentiates between the two aforementioned scenarios (e.g., $\eta \approx 0$ when changes in Z are much larger than changes in H, $\eta \approx 1$ when changes in H are much larger than changes in Z). $\eta$ may approach a first value as the ratio of dH/dt becomes larger than dZ/dt and a second value in the opposite case (dZ/dt becomes larger than dH/dt). test $\eta$ may differentiate between these two types of change by looking at correlation across frequency in the power change; while dynamic channel change is correlated across frequency, noise change is generally not.

This channel update change may be written as $$\tilde{H}_{i,k} = \hat{H}_{i,k} - \hat{H}_{i-1,k} = \Delta_{i,k} + R_{i,k}$$

where i represents time, k represents subcarrier, $\Delta$ represents the change in channel update power due to channel dynamics, and R represents the change in channel dynamics due to noise (e.g., an actual receive signal).

In a first example of the second implementation, $\eta$ is a correlation coefficient written as:

$$\eta = \frac{\sum_{k=1}^{K-1} \tilde{H}_{i,k-1}^* \tilde{H}_{i,k}}{\sum_{k=1}^{K-1} |\tilde{H}_{i,k}|^2}$$

further noting $$\eta = \frac{\sum_{k=1}^{K-1} \tilde{H}_{i,k-1}^* \tilde{H}_{i,k}}{\sum_{k=1}^{K-1} |\tilde{H}_{i,k}|^2} \approx \frac{\sum_{k=1}^{K-1} \Delta_{i,k-1}^* \Delta_{i,k} + \sum_{k=1}^{K-1} R_{i,k-1}^* R_{i,k}}{K\sigma_{Rx}^2 + \sum_{k=1}^{K-1} |\Delta_{i,k}|^2} \approx \frac{\sum_{k=1}^{K-1} \Delta_{i,k-1}^* \Delta_{i,k}}{K\sigma_{Rx}^2 + \sum_{k=1}^{K-1} |\Delta_{i,k}|^2}$$

While this example metric operates via identification of frequency correlation, dynamic channel change is also correlated over time. Therefore, an alternative metric may be used:

$$\eta = \frac{\sum_{k=1}^{K-1} \tilde{H}_{i,k}^* \tilde{H}_{i+1,k}}{\sum_{k=1}^{K-1} |\tilde{H}_{i,k}|^2}$$

Any metric measuring correlation across frequency and/or time may be used as an alternative metric for $\eta$. As another example, $$\eta' = \frac{|\Delta_{i,k}|^2}{|\Delta_{i,k}|^2 + |R_{i,k}|^2} = \frac{\sum_{k=1}^{K-1} |A * \tilde{H}_{i,k}|}{\sum_{k=1}^{K-1} \tilde{H}_{i,k}}$$

where A is a smoothing matrix or other filtering operation.

The controller 144 may modify averaging window in any manner based on $\eta$. For example, the controller 144 may set a smaller averaging window if $\eta$ approaches 1 (resulting in faster updates) or a larger averaging window if $\eta$ approaches 0 (resulting in more immunity to noise).

Figure 6:
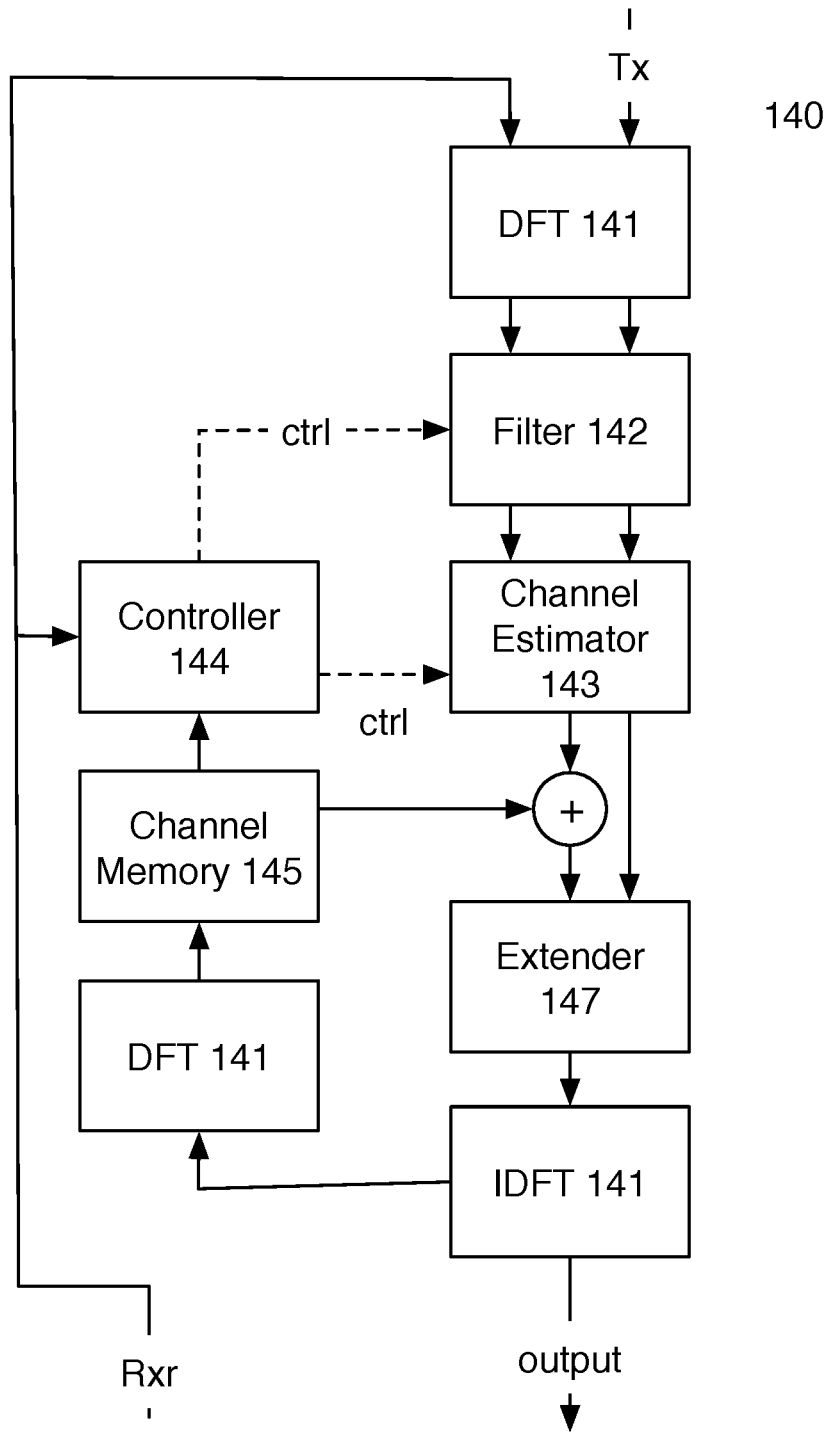
FIG. 6 is a schematic representation of a digital self-interference canceller of a system of an invention embodiment.
Figure 7:
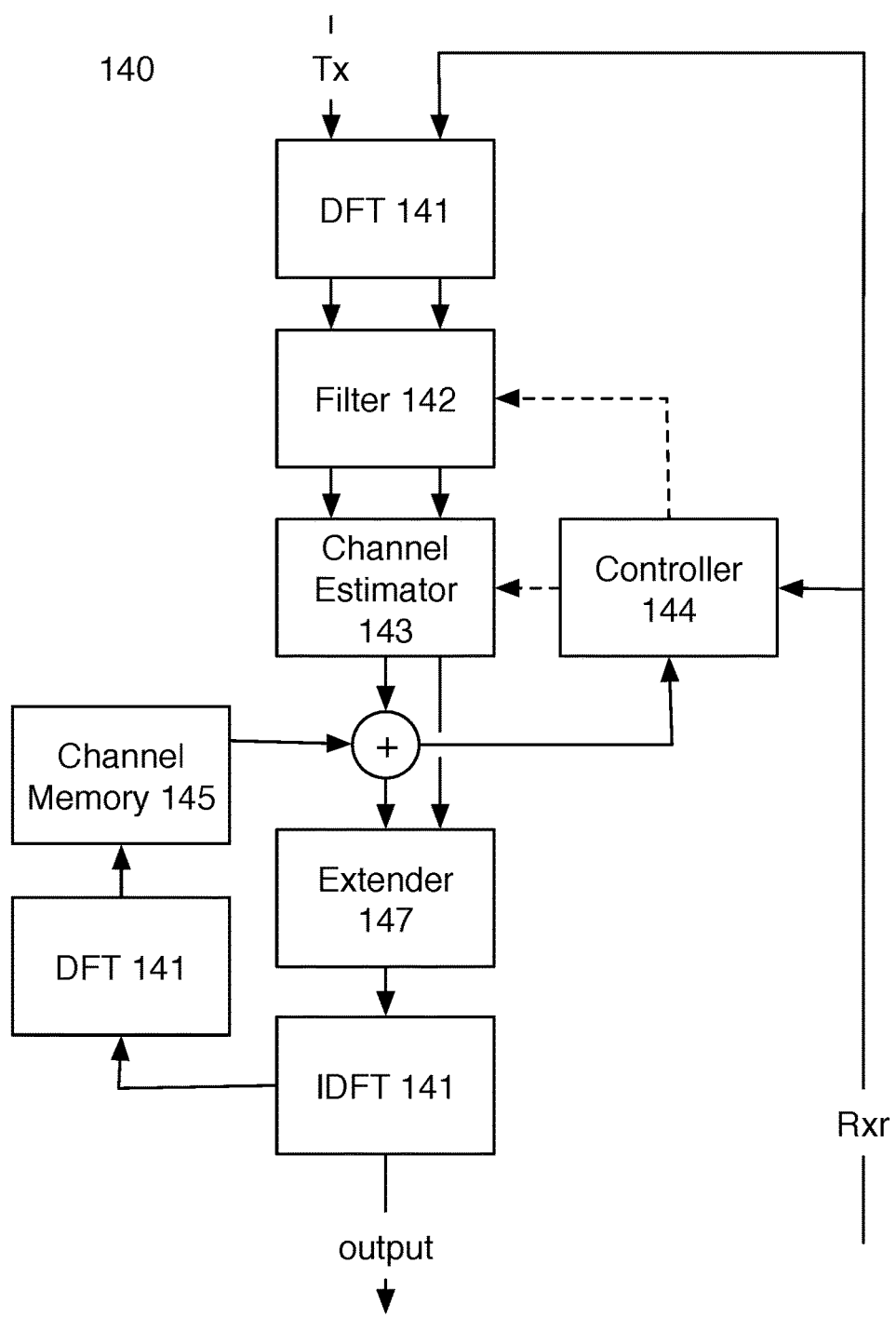
FIG. 7 is a schematic representation of a digital self-interference canceller of a system of an invention embodiment.
Figure 8:
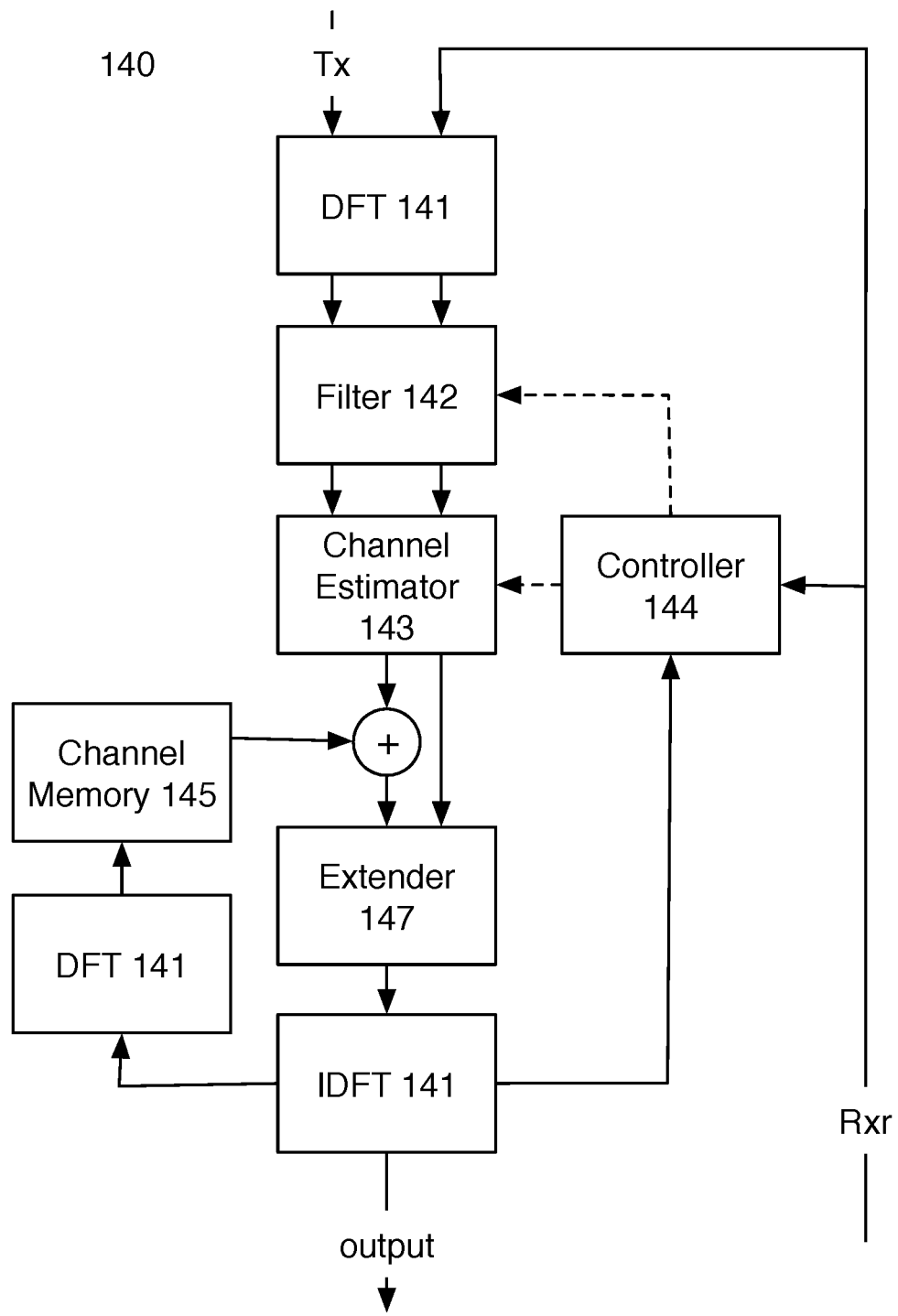
FIG. 8 is a schematic representation of a digital self-interference canceller of a system of an invention embodiment.

Note that while the controller 144 preferably uses channel estimates generated by the channel estimator 143 to set averaging windows, the controller 144 may additionally or alternatively use channel estimates (or other self-interference channel information) from any other source. For example, the controller 144 may set averaging windows based on channel estimates received from channel memory, as shown in FIG. 6. In this example, the channel estimate used is less noisy; however, this noise may be colored due to Fourier transforms, which in turn may make the correlation metric less reliable. As a second example, the controller 144 may set averaging windows based on channel estimates received from the total updated channel, as shown in FIG. 7. Here, the channel noise is white and can be easily extended to architectures where the entire channel is re-estimated every update (as opposed to incremental updates); however, the noise variance is higher (and thus adaptive thresholds may be needed). As a third example, the controller 144 may set averaging windows based on channel estimates received from the time-domain (and potentially extended) total updated channel, as shown in FIG. 8. Here, the noise variance is smaller and requires fewer computations; however, the out-of-band channel influences the correlation metric, making it potentially less reliable.

The channel memory 145 functions to hold data relating to past self-interference channel estimates. In some use cases, it may be desired that the filter 142 and channel estimator 143 operate on only a subset of a full communication channel at a time. In many communication schemes, transmission may occur only some subchannels (of an overall full channel) at a given time. Accordingly, it may be possible (or desirable) only to update subchannels for which transmit signal data is available. In these use cases, the channel memory 145 functions to store the last known self-interference channel for each subchannel (or any other representation of the full self-interference channel) which may be combined with an incremental update generated by the channel estimator 143 to create a new full channel estimate. As shown in FIG. 3A, this new full channel estimate is then sent to the channel memory 145, where it may be stored as the most recent self-interference channel estimate.

Note that as shown in FIG. 3A, the channel estimate stored by the channel memory may be transformed before storage; however, additionally or alternatively the channel memory 145 may be updated directly from the combination of the channel memory 145 output and the channel estimator 143 output.

The digital self-interference canceller 140 may combine channel estimates from channel memory 145 with the output of the channel estimator 143 in any manner. For example, the digital self-interference canceller 140 may replace a section (e.g., a sub-band) of a past channel estimate with the output of the channel estimator 143. As a second example, the channel estimator 143 may average the output of the channel estimator 143 and the channel memory 145 within a sub-band of relevance.

The predictor 146 functions to predict a future self-interference cancellation channel estimate from current and/or past self-interference cancellation channel estimates. Because performing cancellation tuning takes time, any tuning on a varying self-interference channel is obsolete as soon as it is complete. The predictor 146 preferably modifies the output of the channel estimator 143 to compensate for some or all of the delay incurred by the tuning process. Additionally or alternatively, the predictor 146 may predict future self-interference cancellation channels in order to increase time in between tuning for the canceler 140.

Figure 9A:
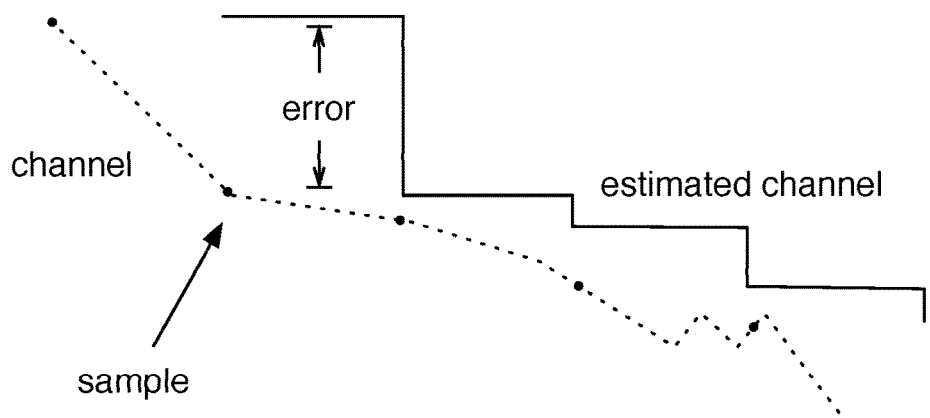
FIG. 9A is a plot representation of a self-interference channel estimate.
Figure 9B:
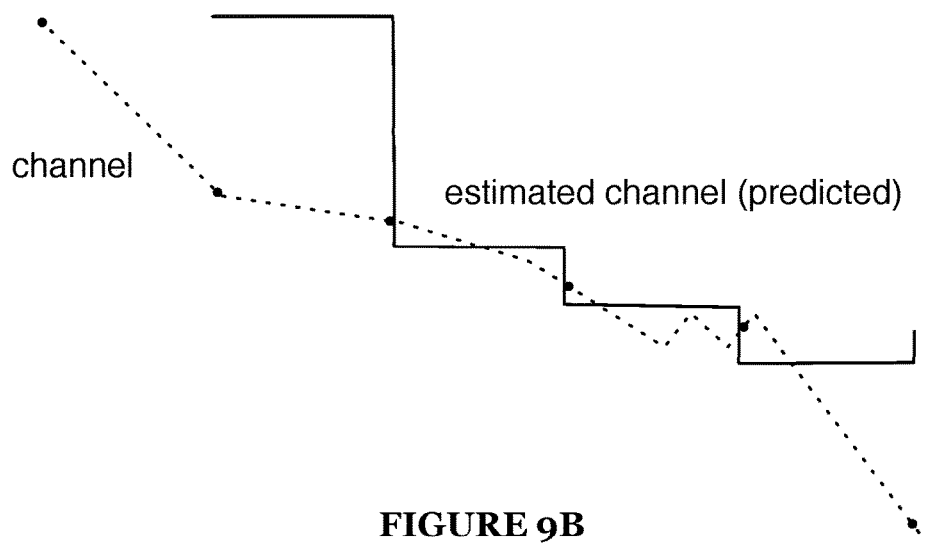
FIG. 9B is a plot representation of a predicted self-interference channel estimate.

For example, as shown in FIG. 9A, the estimated channel lags behind actual channel. The predictor 146 may modify the estimated channel based on past channel estimates, leading to a predicted channel, as shown in FIG. 9B. This may result in a significant reduction of error.

The predictor 146 may attempt to compensate for a known or estimated tuning delay (e.g., the delay between sampling a signal and estimating the self-interference channel from that signal), but may additionally or alternatively extrapolate the self-interference channel into the future by any amount of time (e.g., a time less than or greater than the aforementioned delay). Extrapolation may be performed using instantaneous time deltas, but may additionally or alternatively be performed using filtered time deltas (e.g., averaging measured time deltas). For example, using instanteous time deltas, the predictor 146 may perform extrapolation for a given self-interference channel estimate based on the difference between the time at which the digital transmit signal and residue signal were sampled and the time that a channel estimate was generated. Likewise, using filtered time deltas, the predictor 146 may perform extrapolation based on the average of several such differences (e.g., the most recent three differences).

The predictor 146 preferably predicts self-interference channel data on a per-subcarrier (or per sub-band) basis (i.e., the self-interference channel of each subcarrier is predicted independently). Alternatively, the predictor 146 may jointly predict time and frequency variance of the self-interference channel (discussed in later sections).

The predictor 146 preferably performs linear extrapolation of the channel, but may additionally or alternatively perform any type of extrapolation (e.g., quadratic). The predictor 146 may additionally or alternatively perform signal prediction using any technique (e.g., Weiner filtering, MMSE prediction, adaptive filtering techniques such as LMS and RLS, or neural network/machine learning based techniques).

Figure 10:
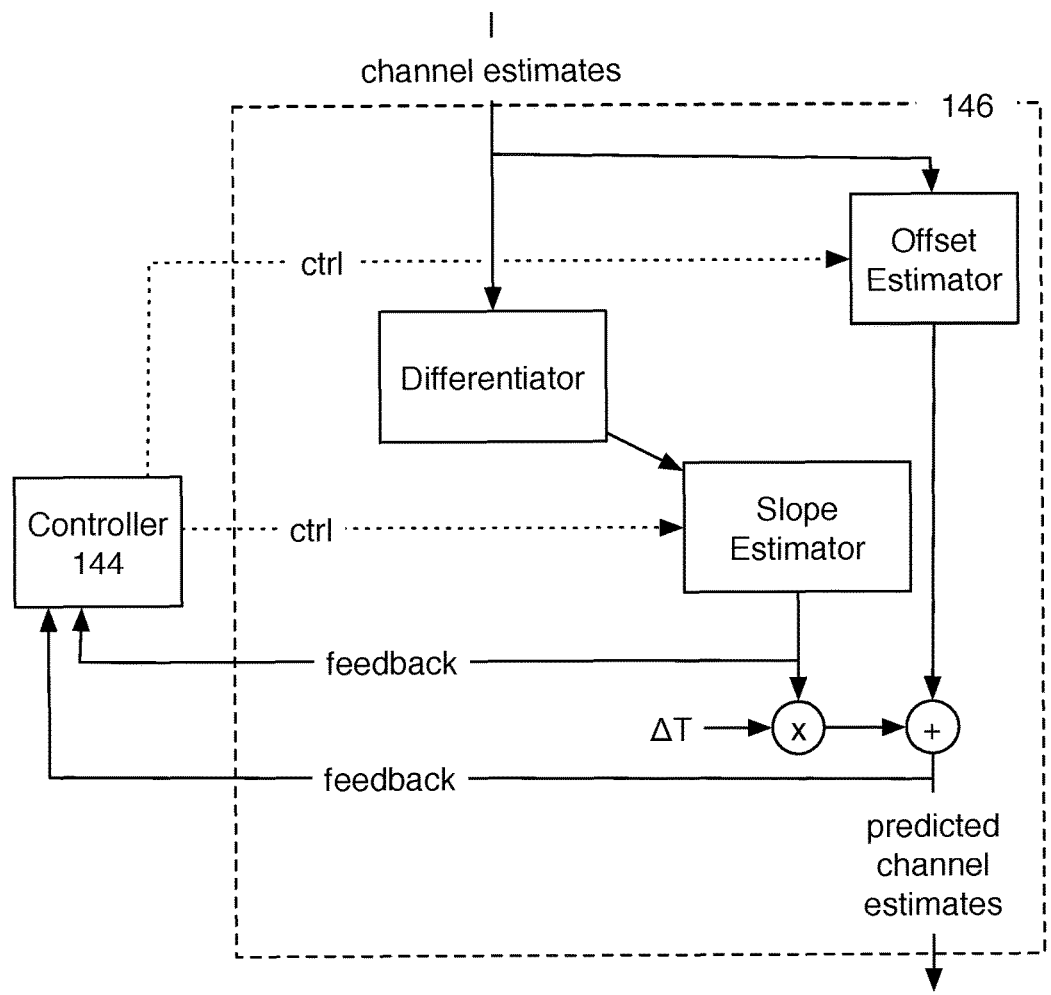
FIG. 10 is a schematic representation of a predictor of a digital self-interference canceller of a system of an invention embodiment.
Figure 11:
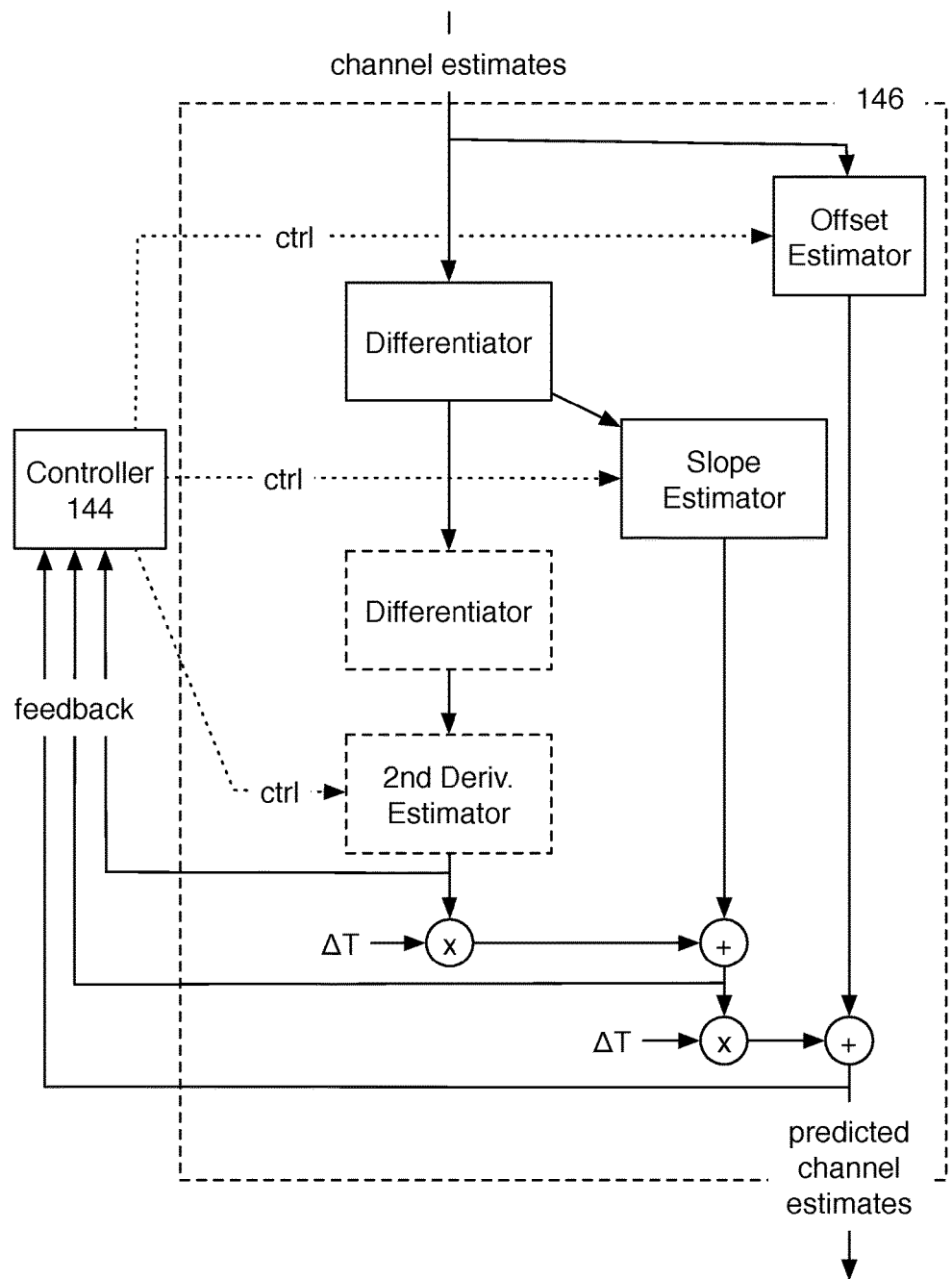
FIG. 11 is a schematic representation of a predictor of a digital self-interference canceller of a system of an invention embodiment.

In one implementation of an invention embodiment, the predictor 146 includes an offset estimator, a differentiator, and a slope estimator, as shown in FIG. 10. In this implementation, the offset estimator and slope estimator are preferably infinite impulse response (IIR) low-pass filters, but additionally or alternatively, the estimators may be any suitable transformers capable of determining the slope and offset (i.e., the linear characteristics) of the self-interference channel. The estimators are preferably controlled by the controller 144 in response to feedback received at the controller, but may additionally or alternatively be controlled in any manner. Note here that the time $\Delta T$ represents the amount of extrapolation desired. This concept may be extended to any order; for example a predictor 146 including a $2^{nd}$ derivative estimator is as shown in FIG. 11.

Further, the predictor 146 may additionally or alternatively predict self-interference channels in non-Cartesian coordinates. For example, the predictor 146 may transform self-interference channel estimates from Cartesian to polar coordinates, perform time extrapolation, and then convert back from polar to Cartesian coordinates.

As previously discussed, the predictor 146 preferably performs prediction on a per sub-carrier basis. In many communication schemes (e.g., LTE), even during periods of activity, not every sub-carrier is scheduled every symbol. There are two primary consequences that pertain to the predictor 146. The first is that if a sub-carrier is not active, prediction may not be useful until that sub-carrier is active again. The second is that if a substantial amount of inactive time passes, the incremental self-interference channel for that sub-carrier is often not accurately represented by an extrapolation of stale data. Further, the presence of stale data may cause new channel estimates to converge slowly.

The predictor 146 preferably addresses these issues by tracking the activity of each subcarrier and managing predictor state (for each sub-carrier) based on this activity. The predictor 146 preferably monitors the most recent times when each sub-carrier was scheduled. In an implementation of an invention embodiment, when a sub-carrier is (or will be) inactive for a substantial time (i.e., a time greater than some threshold), the prediction for that sub-carrier is disabled. This is referred to as the RESET state. Additionally, the memory for that prediction may be cleared (preventing stale data from influencing later prediction). When the sub-carrier is active again, prediction is enabled in the WARMUP state. In this state, prediction begins estimating channel parameters (e.g., slope and offset), but does not yet modify the channel estimate based on these parameters. After satisfaction of the WARMUP state (e.g., by passing a time threshold, by reaching a threshold parameter convergence), prediction is enabled in the NOMINAL state (where prediction operates as normal). Alternatively, prediction output and state many be managed in any way. For example, prediction may be turned on for linear components of the self-interference channel, but disabled for higher order components of the self-interference channel.

Figure 12:
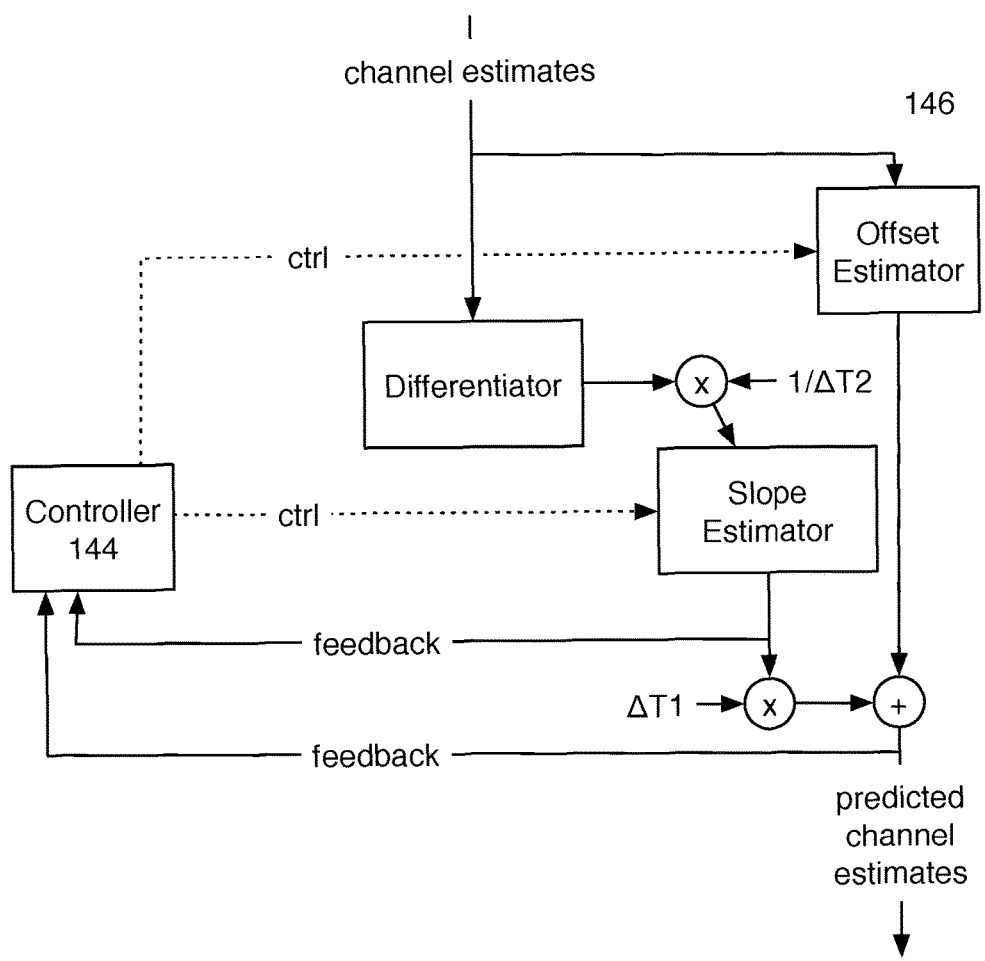
FIG. 12 is a schematic representation of a predictor of a digital self-interference canceller of a system of an invention embodiment.

Predicting channel estimates may have additional challenges when sub-carriers are not uniformly sampled in time. In an implementation of an invention embodiment, the predictor 146 scales differential values based on latched timestamps to compensate for non-uniform sampling, as shown in FIG. 12. Here, $\Delta T1$ is the time at which prediction is desired minus the current time, and $\Delta T2$ is the current time minus the previous update time.

While the predictor 146 has been described in some implementations as a combination of digital elements (see e.g., FIGS. 10-12), the predictor 146 may additionally or alternatively be implemented in any way; for example, as an end-to-end transfer function performing prediction.

Figure 13:
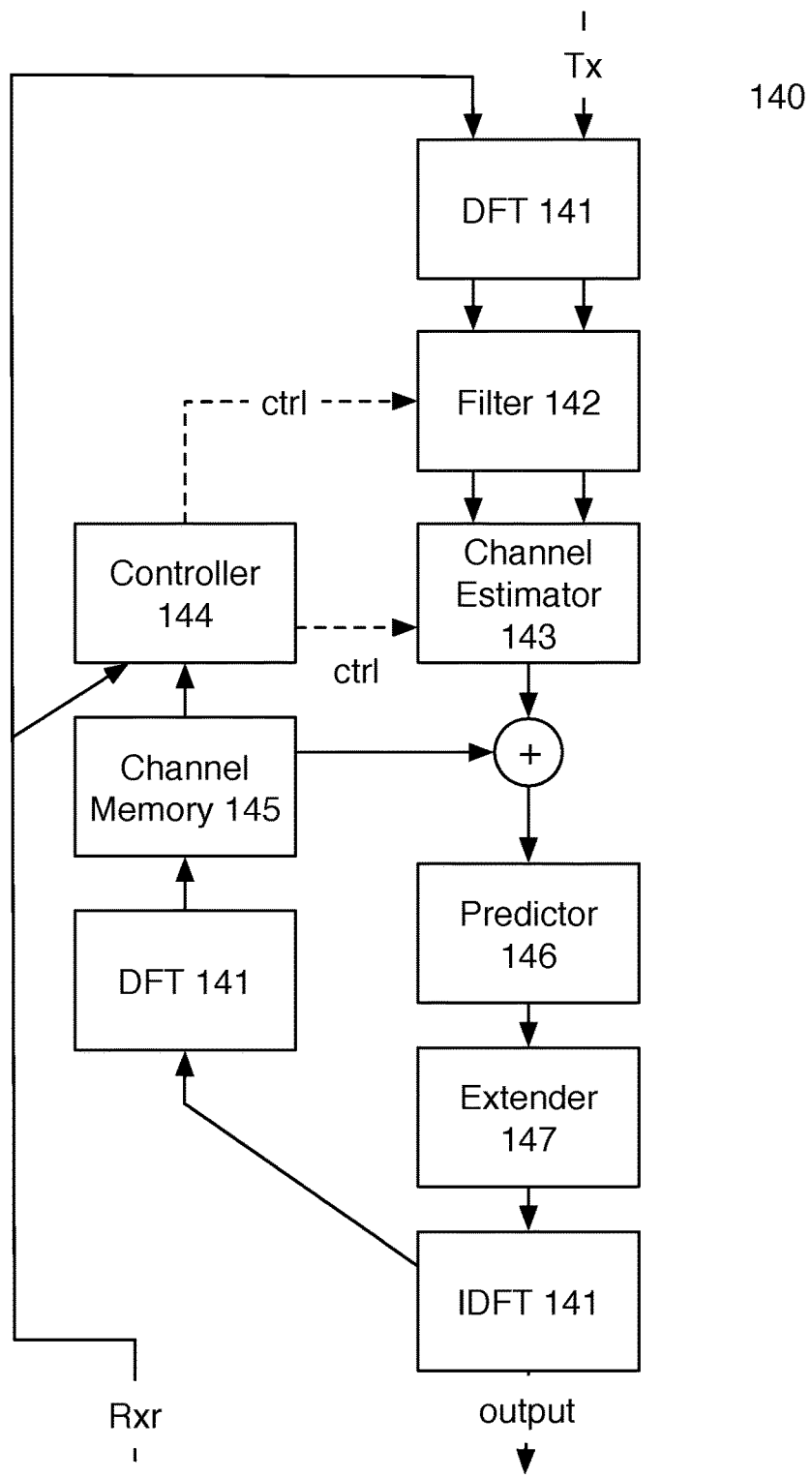
FIG. 13 is a schematic representation of a digital self-interference canceller of a system of an invention embodiment.
Figure 14:
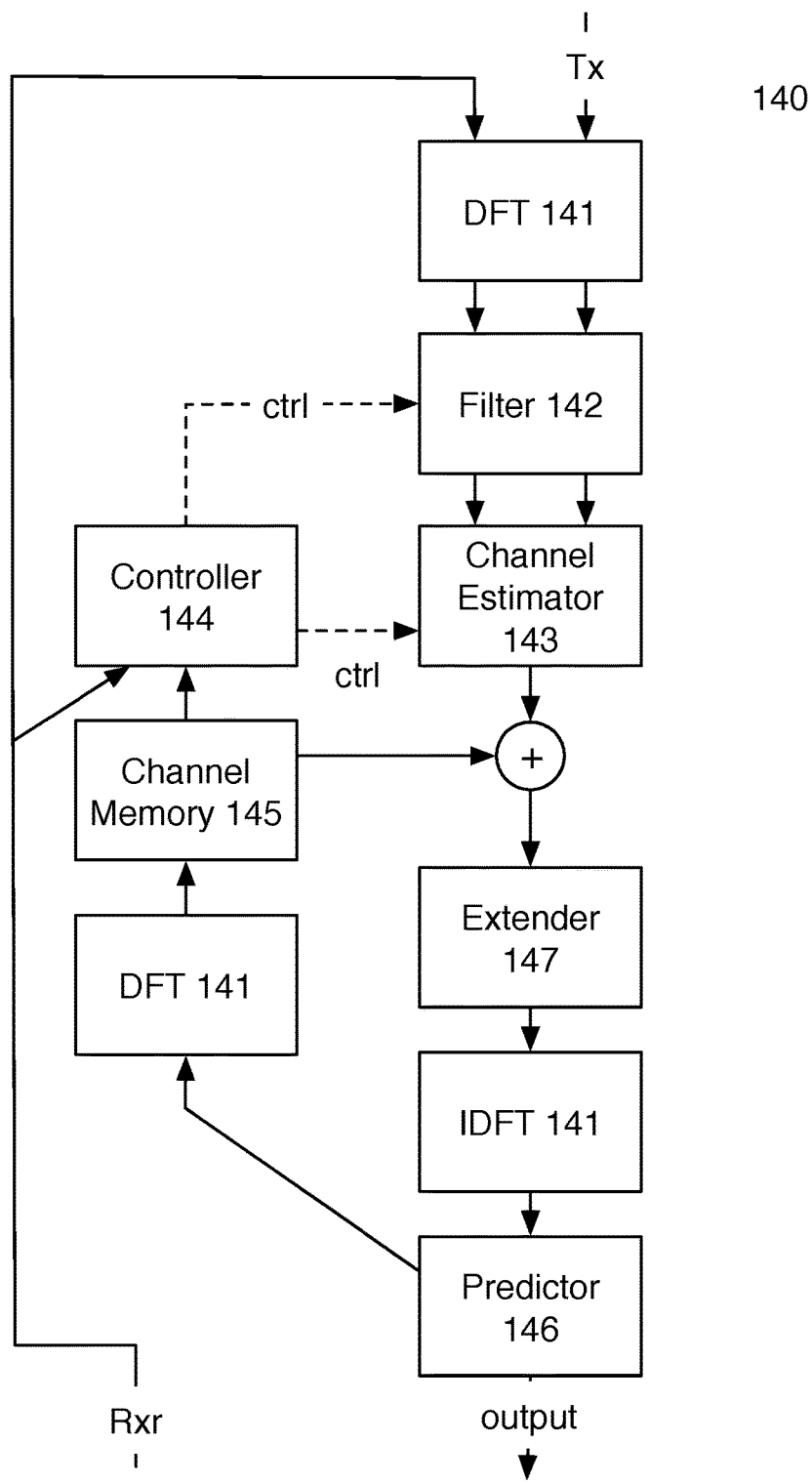
FIG. 14 is a schematic representation of a digital self-interference canceller of a system of an invention embodiment.

The predictor 146 preferably performs prediction in the frequency domain, as shown in FIG. 13. Alternatively, the predictor 146 may perform prediction in the time domain, as shown in FIG. 14. This can reduce the complexity of prediction (because the time domain solution is generally smaller than the frequency domain solution), but may also diminish the ability to control for prediction on a sub-carrier basis.

Figure 15:
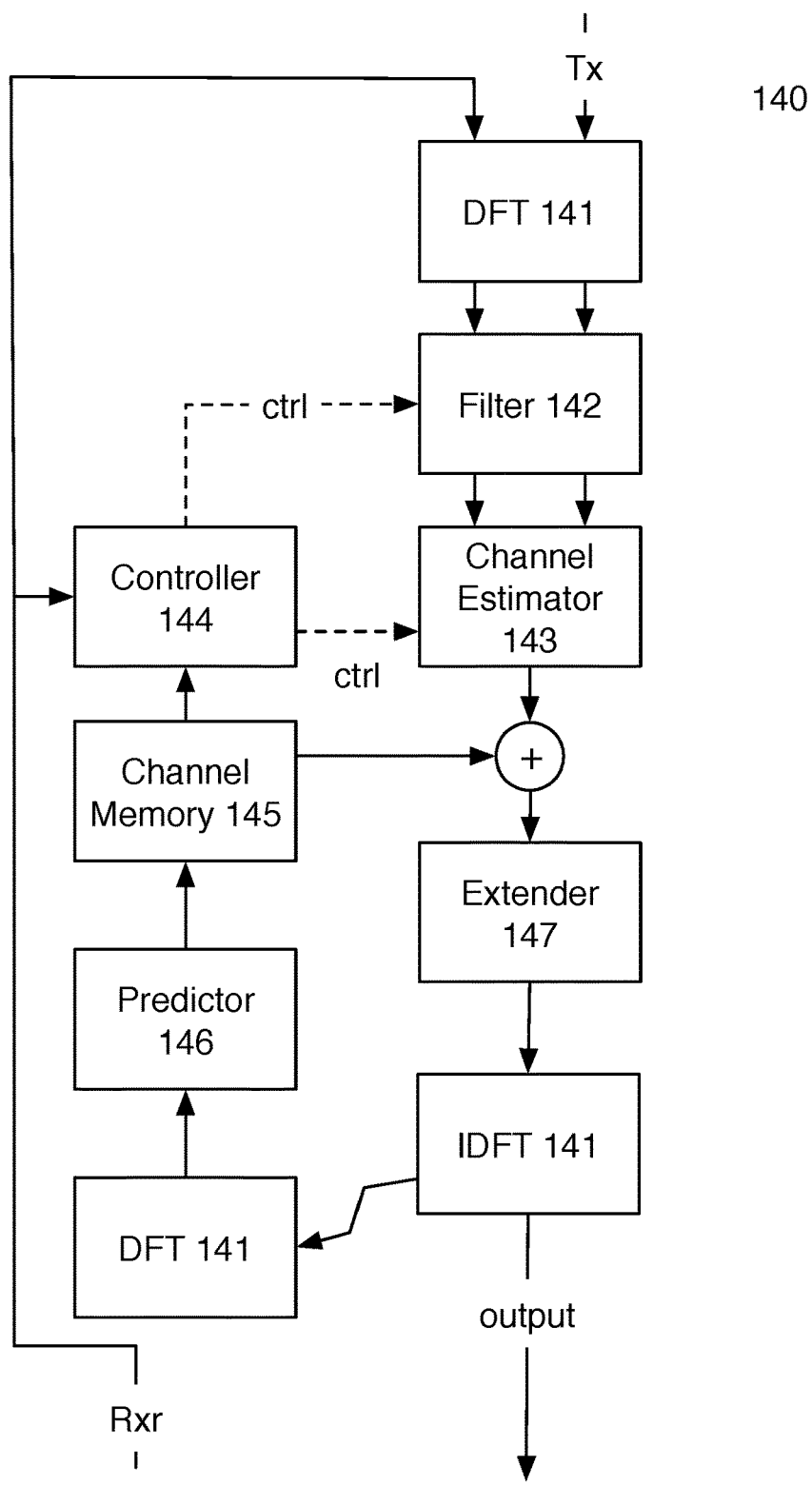
FIG. 15 is a schematic representation of a digital self-interference canceller of a system of an invention embodiment.

As another alternative configuration, the predictor 146 may occur after the channel estimate has been converted to time domain and then back again to frequency domain (e.g., denoising), as shown in FIG. 15. While denoising leads to a cleaner prediction, it may also increase prediction complexity.

In a variation of an invention embodiment, the predictor 146 may extrapolate for a given subcarrier based not only on historical channel data for that subcarrier, but also for neighboring subcarriers. This may be particularly useful for communications systems where sub-carriers are scheduled intermittently.

Figure 16A:
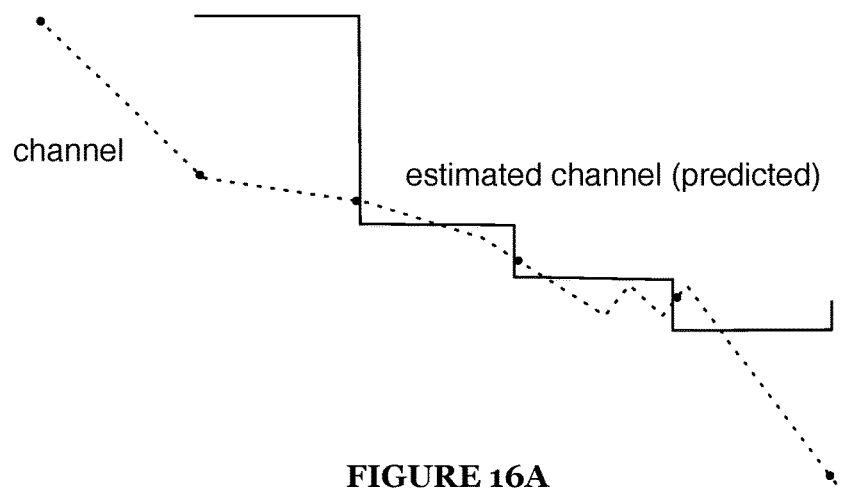
FIG. 16A is a plot representation of a predicted self-interference channel estimate.
Figure 16B:
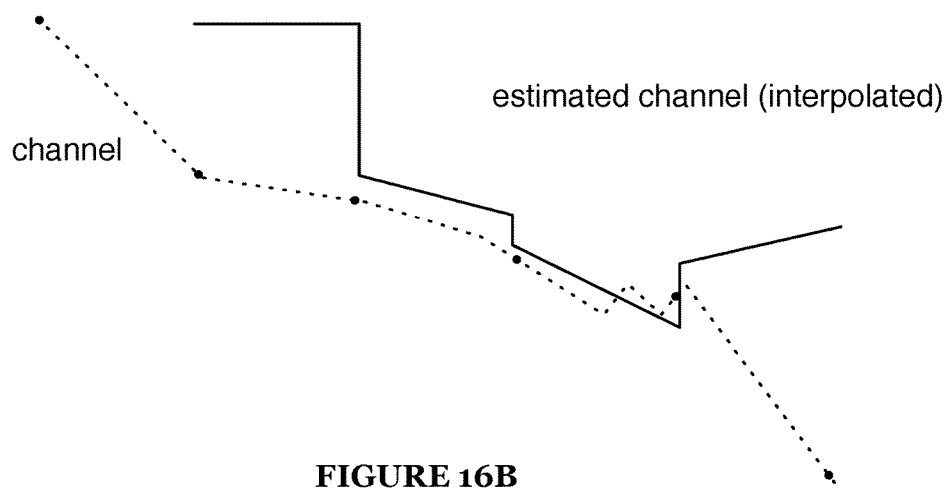
FIG. 16B is a plot representation of a time-interpolated predicted self-interference channel estimate.

While the predictor 146 as described above generally calculates an extrapolated channel estimate across frequencies for a given time, the predictor 146 may additionally perform time-domain interpolation to bridge between frequency-domain extrapolations. To exemplify this, consider a purely frequency domain example of the predictor. A first estimate of the channel is given at $t_0$, and a second estimate of the channel is estimated to occur at $t_1$. In a first example (with no time-domain interpolation), the self-interference channel is predicted on an extrapolation of the channel estimate at $t_0$ extrapolated by $$\Delta T = \frac{t_1 - t_0}{2},$$

as shown in FIG. 16A. This channel estimate is used until the second estimate of the channel is received (if the extrapolation is close to reality, self-interference performance will be best at $t_0+\Delta T$, and not as good elsewhere). In a time-domain interpolation example, the self-interference channel is predicted on an extrapolation of the channel estimate at $t_0$ extrapolated by $\Delta T=t_1-t_0$, and then linearly interpolated based on the current time, as shown in FIG. 16B. This provides some of the advantages of time-domain prediction without the full complexity.

The extender 147 functions to extend self-interference channel estimates to smooth estimate edges (e.g., if a self-interference channel is calculated for a particular band and zero outside of that band, there may be a discontinuity or sharp edge at the band edge). Edges or other rapidly-varying features may require a large number of components to accurately implement the channel estimate in the time domain (e.g., in the interference canceller 140). Thus, it may be desirable to smooth such features in the frequency domain representation of the self-interference channel prior to converting the channel estimate to a time domain representation, in order to simplify the time domain representation of the transform in the canceller 140.

In smoothing either the magnitude or phase response of the channel estimate in the frequency domain, it may be necessary for the extender 147 to identify and/or locate edges or other similarly abrupt changes and/or rapidly varying features. Various techniques may be used to locate the edges. A first such variation is to compute the local derivative of the response vs. frequency (e.g., using a finite-differencing scheme) at each frequency value of the response, and to consider an "edge" to be located at any frequency where the local derivative exceeds a particular threshold. Thus, a local slope that is sufficiently "steep" (i.e., has a sufficiently large first derivative) can be recognized as an edge or other feature in need of smoothing. A related variation includes computing the local first derivative only within frequency bands of the response where sharp variations are known to occur, in order to reduce the computation time of edge detection. In other variations, locating edges or other abrupt changes may include one or a combination of step detection algorithms, such as o-degree spline fitting, piecewise constant denoising, and variational methods (e.g., the Potts model). Additionally or alternatively, abrupt changes in the responses requiring smoothing can be located in any other suitable manner.

Figure 17:
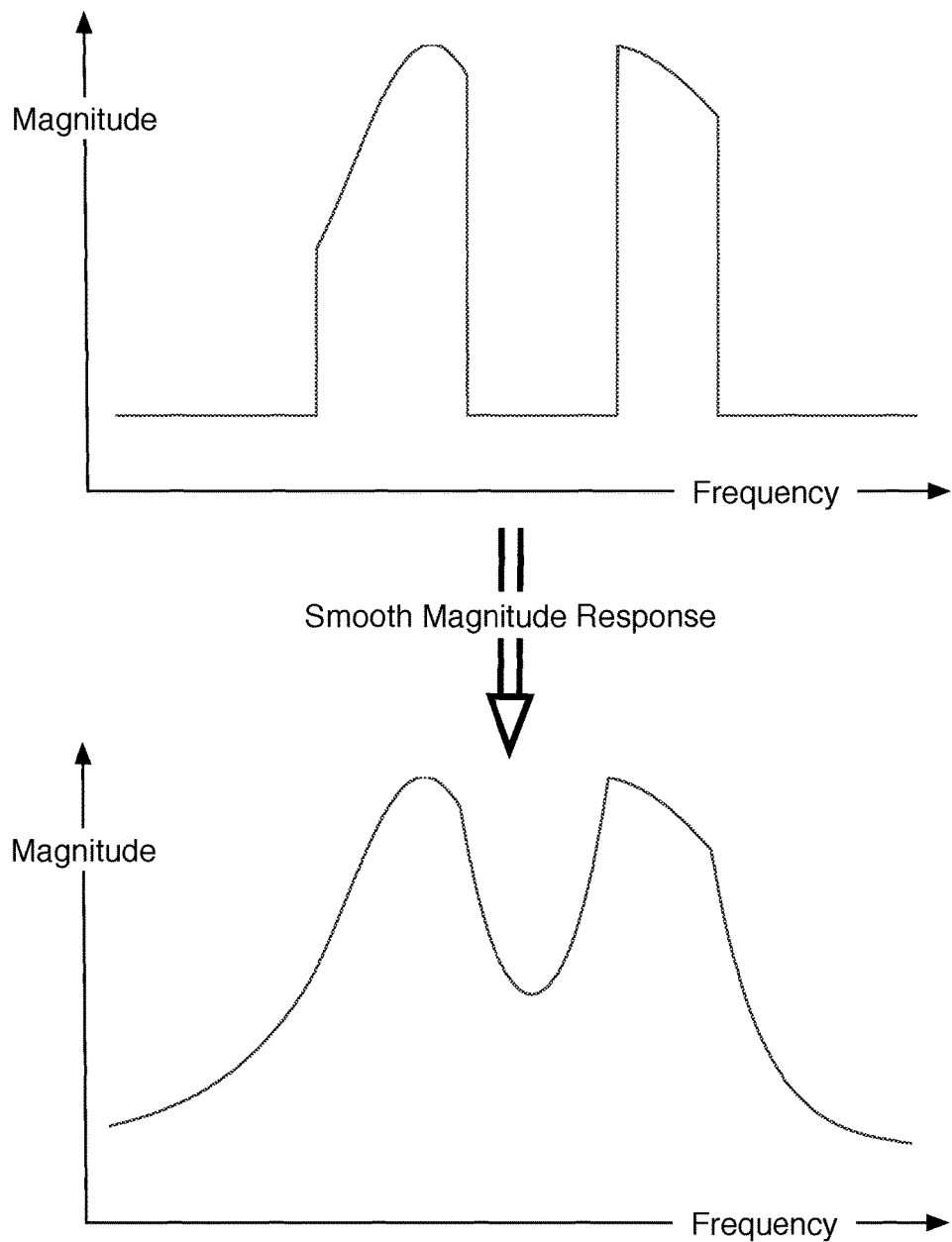
FIG. 17 is a plot representation of self-interference channel magnitude smoothing.

As shown in FIG. 17, the extender 147 preferably includes smoothing the magnitude response of a self-interference channel estimate. In this example, exponential decay functions are matched to edges (i.e., where the derivative of magnitude response vs. frequency exceeds a threshold) of the magnitude response. However, other functions may additionally or alternatively be matched to the edges of the magnitude response, such as a polynomial function, a cubic spline, or any other suitable smoothly varying function. The function used is preferably selected in order to minimize the number of components needed to represent the transform in the time domain, but can alternatively be selected for any suitable reason. The extender 147 may also extrapolate or otherwise modify magnitude response of an estimate in any manner, including performing curve fitting on portions of the magnitude response of an estimate. The extender 147 may also filter portions of the magnitude response of the estimate (e.g., median filtering, convolution filtering, and/or any other suitable smoothing filtering).

Figure 18:
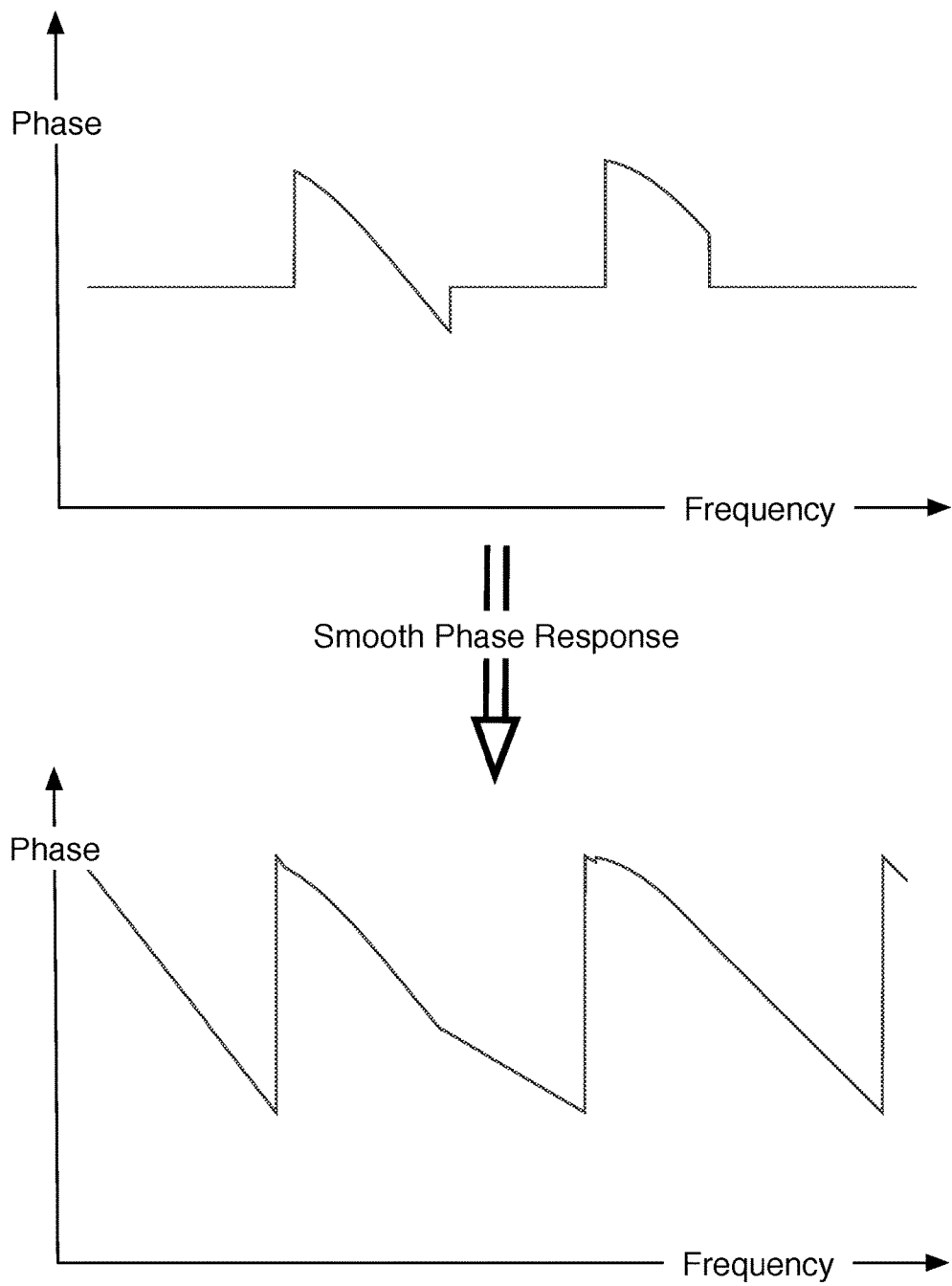
FIG. 18 is a plot representation of self-interference channel phase smoothing.

As shown in FIG. 18, the extender 147 preferably also smooths the phase response of the transform. In this example, phase is extrapolated linearly between edges of phase response (i.e., where the derivative of phase response vs. frequency exceeds a threshold). The extender 147 may also extrapolate or otherwise modify phase response of an estimate in any manner, including performing curve fitting on portions of the phase response of an estimate. The extender 147 may also filter portions of the phase response of the estimate (e.g., median filtering, convolution filtering, and/or any other suitable smoothing filtering).

The digital self-interference canceller 140 may additionally or alternatively include any other components as described in U.S. patent application Ser. No. 15/362,289, e.g., blocker filters, filter inverters, etc. The digital self-interference canceller 140 may additionally or alternatively include gain/phase compensators that function to modify the gain and phase of either the digital receive signal or the digital self-interference cancellation signal such that the two signals are aligned in gain and phase. Gain/phase compensation thus enables the canceller 140 to compensate for gain and/or phase error induced by the receive chain (or other sources). Gain/phase correction values are preferably set by the controller 144, but may additionally or alternatively be set in any manner.

The ADC 150 functions to convert a transmit signal from an analog signal to a digital signal; this signal is hereafter referred to as a converted transmit signal. Alternatively, the signal post-conversion may be referred to as an RF-sourced digital transmit signal (assuming conversion from an RF transmit signal) or an IF-sourced digital transmit signal (assuming conversion from an IF transmit signal). The ADC 150 is preferably substantially similar to the ADC 111, but may additionally or alternatively be any suitable ADC.

In addition to analog-to-digital signal conversion, the ADC 150 may perform signal scaling (in either analog or digital domains) as well as frequency conversion (in either analog or digital domains) for input analog signals. In one implementation, the ADC 150 includes at least one of a variable-gain amplifier (VGA) and a digital scaler. The variable-gain amplifier functions to scale an analog signal before conversion via the ADC 150, while the digital scaler functions to scale a digital signal after conversion via the ADC 150. Both the VGA and digital scaler are preferably capable of scaling signals with any complex multiplier (e.g., resulting in both amplitude and phase shift), but may additionally or alternatively be capable of scaling signals with a subset of the set of complex numbers. For example, a VGA may only be capable of scaling signals by a real number between 1 and 4.

The ADC 151 is preferably substantially similar to the ADC 150, except the ADC 151 functions to convert a receive signal from an analog signal to a digital signal. The ADC 151 preferably is used to sample a receive signal post-self-interference cancellation (i.e., a residue signal) to evaluate self-interference canceller 140/160 performance and/or aid in canceller tuning. Note that the system 100 may include multiple ADCs 151, and they may sample receive signals of the system 100 at any point. For example, the system 100 may include three ADCs 151; one coupled to a receive signal prior to any self-interference cancellation, one coupled to a receive signal after analog self-interference cancellation but prior to digital self-interference cancellation, and one coupled to the receive signal after both analog and digital self-interference cancellation. Likewise, one ADC 151 may couple to all three of those signals.

The DAC 152 functions to convert the digital self-interference cancellation signal from a digital signal to an analog signal; this signal is hereafter referred to as a converted digital self-interference cancellation signal. Alternatively, the signal post-conversion may be referred to as an digitally-sourced RF self-interference cancellation signal (assuming conversion to RF) or a digitally-sourced IF self-interference cancellation signal (assuming conversion to IF). The DAC 152 is preferably substantially similar to the DAC 121, but may additionally or alternatively be any suitable DAC.

In addition to digital-to-analog signal conversion, the DAC 152 may perform signal scaling (in either analog or digital domains) as well as frequency conversion (in either analog or digital domains) for input digital signals. In one implementation, the DAC 152 includes at least one of a variable-gain amplifier (VGA) and a digital scaler. The digital scaler functions to scale a digital signal before conversion via the DAC 152, while the VGA functions to scale an analog signal after conversion via the DAC 152. Both the VGA and digital scaler are preferably capable of scaling signals with any complex multiplier (e.g., resulting in both amplitude and phase shift), but may additionally or alternatively be capable of scaling signals with a subset of the set of complex numbers. For example, a VGA may only be capable of scaling signals by a real number between 1 and 4.

VGAs and/or digital scalers of the ADCs 150/151 and the DAC 152 are preferably controlled by the controller 144. For example, the controller 144 could set the scale factor of a scaler (dig. scaler and/or VGA) of the DAC 152 based on the content and/or amplitude of a residue signal; e.g., the transform adaptor 142 may increase the gain of the DAC 152 output in order to lower self-interference present in the residue signal. As another example, the controller 144 could temporarily reduce the gain of the DAC 152 to 0 for tuning purposes (e.g., to establish a baseline level of cancellation in the residue signal, where the baseline level is set based solely on cancellation performed by the analog canceller 160). As a third example, the controller 144 could increase the gain of the ADC 151 in response to a low-amplitude residue signal (e.g., the ADC 151 VGA gain could be re-set to increase the likelihood that the signal is neither clipped nor lost in noise by the analog-to-digital conversion block).

The analog self-interference canceller 160 functions to produce an analog self-interference cancellation signal from an analog transmit signal that can be combined with an analog receive signal to reduce self-interference present in the analog receive signal. The analog self-interference canceller 160 is preferably designed to operate at a single frequency band, but may additionally or alternatively be designed to operate at multiple frequency bands. The analog self-interference canceller 160 may include any of the circuits related to analog self-interference cancellation of U.S. patent application Ser. No. 14/569,354; e.g., the RF self-interference canceller, the IF self-interference canceller, associated up/downconverters, and/or tuning circuits.

The analog self-interference canceller 160 is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller 160 may perform a transformation involving only a single version or copy of the analog transmit signal. The transformed signal (the analog self-interference cancellation signal) preferably represents at least a part of the self-interference component received at the receiver.

The analog self-interference canceller 160 is preferably adaptable to changing self-interference parameters in addition to changes in the analog transmit signal; for example, transceiver temperature, ambient temperature, antenna configuration, humidity, and transmitter power. Adaptation of the analog self-interference canceller 160 is preferably performed by a tuning circuit, but may additionally or alternatively be performed by a control circuit or other control mechanism included in the canceller or any other suitable controller (e.g., by the controller 144).

In particular, the analog self-interference canceller 160 may be paused (e.g., generation of an analog self-interference cancellation signal may temporarily cease) or otherwise disabled by a tuning circuit or other controller (e.g., the controller 144). Alternatively, tuning of the analog self-interference canceller 160 may be paused (e.g., an iterative tuning process stopped, temporarily or otherwise).

Note that while the preceding paragraphs primarily describe a SISO (single-input single-output) implementation of the system 100, the system 100 may additionally or alternatively be implemented as a MIMO (multiple-input, multiple-output) system (or MISO, SIMO, etc.). The system 100 may be a 2×2 MIMO system, but may additionally have any suitable number of transmit and receive signal paths. Each signal path may have separate antennas; alternatively, signal paths may share antennas via a duplexer or other coupler. In one example, a 2×2 MIMO system has four antennas: a TX1 antenna, a TX2 antenna, an RX1 antenna, and an RX2 antenna. In another example, a 2×2 MIMO system has two antennas: a TX1/RX1 antenna (coupled to both TX1 and RX1 signal paths via a duplexer) and a TX2/RX2 antenna (coupled to both TX2 and RX2 signal paths via a duplexer).

Note that while a particular configuration of input/output connections for the digital and analog cancellers 140 and 160 are described, any configuration of these inputs and outputs (e.g., using ADCs/DACs to couple the digital canceller to analog signals, including residue signals, as shown in FIG. 2) may be used.

In a MIMO implementation, the transmitter 120 preferably has multiple inputs and outputs. In particular, the transmitter 120 preferably includes a DAC and frequency upconverter for each transmit signal path; additionally or alternatively, transmit signal paths may share DACs and/or frequency upconverters. Additionally or alternatively, the transmitter 120 may be any suitable MIMO transmitter (or the system 100 may include multiple transmitters 120); for example, the transmitter 120 may include MIMO signal splitting or processing circuitry (which may be used to process a single digital signal into multiple MIMO analog signals).

Likewise, the receiver 110 preferably has multiple inputs and outputs. In particular, the receiver no preferably includes an ADC and frequency downconverter for each receive signal path; additionally or alternatively, receive signal paths may share ADCs and/or frequency downconverters. Additionally or alternatively, the receiver 110 may be any suitable MIMO receiver (or the system 100 may include multiple receivers 110); for example, the receiver 110 may include MIMO signal splitting or processing circuitry (which may be used to process a single digital signal into multiple MIMO analog signals).

In a MIMO implementation, the digital self-interference canceller 140 is preferably designed for MIMO operating environments (i.e., multiple transmit and/or receive signals). In MIMO operating environments, self-interference may occur across separate communications streams; for example, a TX1 signal may cause interference in both of RX1 and RX2 signals. The digital self-interference canceller 140 may include multiple cancellation sub-blocks (each incorporating some or all of the functionality of a SISO implementation of the digital self-interference canceller 140). For example, the digital self-interference canceller may include sub-blocks for each possible RX/TX pairing (e.g., RX1/TX1, RX1/TX2, etc.). In this implementation, each sub-block functions to remove self-interference resulting from a particular pairing; e.g., an RX1/TX2 sub-block functions to remove self-interference in the RX1 receive signal resulting from the TX2 transmit signal.

Similarly to the digital self-interference canceller 140, the analog self-interference canceller 160 (implemented in a MIMO system) may split analog self-interference cancellation duties into sub-blocks or sub-circuits as previously described.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for wireless communication. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for digital self-interference cancellation comprising:
    a filter coupled to a digital residue signal of a communication system that reduces noise, thereby generating a reduced-noise digital residue signal;
    a channel estimator coupled to the filter that generates a current self-interference channel estimate from a digital transmit signal, the reduced-noise digital residue signal, and past self-interference channel estimates; wherein the channel estimator generates the current self-interference channel estimate according to a digital transform configuration;
    a controller that dynamically sets the digital transform configuration in response to changes in a controller-sampled digital residue signal; and
    a channel memory, coupled to the channel estimator, that stores the past self-interference channel estimates;
    wherein the system generates a digital self-interference cancellation signal from the current self-interference channel estimate and the digital transmit signal; wherein the digital self-interference cancellation signal is combined with a receive signal of the communication system to form the digital residue signal.

2. The system of claim 1, wherein the channel estimator generates the digital self-interference cancellation signal from the self-interference channel estimate, the past self-interference channel estimates, and the reduced-noise digital transmit signal.

3. The system of claim 2, wherein the filter generates the reduced-noise digital residue signal by time-averaging the digital residue signal; wherein time-averaging the digital residue signal comprises time-averaging over an averaging window.

4. The system of claim 3, wherein the controller modifies the averaging window based on a measured magnitude of a ratio of the digital residue signal to the digital transmit signal.

5. The system of claim 4, wherein the controller modifies the averaging window based on a rate of change of the measured magnitude of a ratio of the digital residue signal to the digital transmit signal.

6. The system of claim 3, wherein the controller modifies the averaging window based on a channel dynamics estimation; wherein the channel dynamics estimation measures variation in the digital residue signal and approaches a first value when the variation is primarily due to channel variation and a second value, non-identical to the first value, when the variation is primarily due to noise variation.

7. The system of claim 6, wherein the controller decreases the averaging window as the channel dynamics estimation approaches the first value and increases the averaging window as the channel dynamics estimation approaches the second value.

8. The system of claim 7, wherein the channel dynamics estimation measures correlation between channel subcarriers corresponding to different frequencies.

9. The system of claim 7, wherein the channel dynamics estimation measures correlation between channel subcarriers corresponding to different times.

10. The system of claim 1, wherein the channel memory stores the past self-interference channel estimates on a per-subcarrier basis.

11. The system of claim 10, wherein the digital transmit signal is on a first subcarrier of a set of signal subcarriers; wherein the channel estimator generates the current self-interference channel estimate for the set of signal subcarriers by generating a first subcarrier self-interference channel estimate for the first subcarrier and combining the first subcarrier self-interference channel estimate with past self-interference channel estimates corresponding to other subcarriers of the set of signal subcarriers.

12. The system of claim 11, further comprising a predictor that modifies output of the channel estimator to compensate for delay incurred in tuning the system for digital self-interference cancellation.

13. The system of claim 12, wherein the predictor extrapolates the current self-interference channel estimate into a future time using instantaneous time deltas.

14. The system of claim 12, wherein the predictor extrapolates the current self-interference channel estimate into a future time using filtered time deltas.

15. The system of claim 12, wherein the predictor modifies the output of the channel estimator independently for each subcarrier of the set of signal subcarriers.

16. The system of claim 15, wherein the predictor tracks states for each subcarrier of the set of signal subcarriers; wherein the predictor disables prediction for subcarriers inactive longer than an inactivity threshold; wherein the predictor enables prediction for newly subcarriers after a time period longer than a warmup threshold.

17. The system of claim 12, wherein the predictor modifies the output of the channel estimator jointly across subcarriers of the set of signal subcarriers.

18. A system for digital self-interference cancellation comprising:
   a first transformer that transforms a digital transmit signal and a digital residue signal of a communication system from a time domain to a frequency domain;
   a filter coupled to the first transformer that reduces noise in the digital residue signal, thereby generating a reduced-noise digital residue signal;
   a channel estimator coupled to the filter that generates a current self-interference channel estimate from a digital transmit signal and the reduced-noise digital residue signal; wherein the channel estimator generates the current self-interference channel estimate according to a digital transform configuration;
   a controller that dynamically sets the digital transform configuration in response to changes in a controller-sampled digital residue signal;
   a channel memory, coupled to the channel estimator, that stores the past self-interference channel estimates; wherein the system generates, in the frequency domain, a digital self-interference cancellation signal from the current self-interference channel estimate, the past self-interference channel estimates, and the digital transmit signal; and
   a second transformer that transforms the digital self-interference cancellation signal from the frequency domain to the time domain;
   wherein the digital self-interference cancellation signal is combined with a receive signal of the communication system to form the digital residue signal.

19. The system of claim 18, wherein the second transformer performs an Inverse Fast Fourier transform (IFFT) using a reduced Inverse Discrete Fourier Transform (IDFT) matrix calculated by first reducing the number of time and frequency domain components present in a Discrete Fourier Transform (DFT) matrix and then calculating a pseudo-inverse of the reduced DFT matrix to generate the reduced IDFT matrix.

20. The system of claim 18, further comprising an extender that smooths magnitude and phase response of the current self-interference channel estimate in the frequency domain.

21. The system of claim 20, further comprising a third transformer that transforms, after smoothing by the extender and transformation to the time domain by the second transformer, the current self-interference channel estimate from the time domain to the frequency domain and stores the smoothed and transformed self-interference channel estimate in the channel memory.

22. The system of claim 21, further comprising a predictor that modifies the current self-interference channel estimate to compensate for delay incurred in tuning the system for digital self-interference cancellation.

23. The system of claim 22, wherein the predictor is between the channel estimator and the extender; wherein the predictor performs prediction in the frequency domain.

24. The system of claim 22, wherein the predictor is after the second transformer; wherein the predictor performs prediction in the time domain.

25. The system of claim 22, wherein the predictor is after the third transformer; wherein the predictor performs prediction upon the smoothed and transformed self-interference channel estimate prior to storage in the channel memory.

* * * * *